(12) United States Patent
Wentworth et al.

(10) Patent No.: US 6,858,664 B2
(45) Date of Patent: Feb. 22, 2005

(54) LIQUID ADHESION PROMOTER FOR CORD-REINFORCED RUBBER AND METAL OR POLYMER SUBSTRATE/RUBBER COMPOSITES

(75) Inventors: Gary Wentworth, Chicago, IL (US); Stephen O'Rourke, Bolingbrook, IL (US); Kimberly L. Stefanisin, Oak Lawn, IL (US); John English, Oak Lawn, IL (US); Zhi Chen, Memphis, TN (US); Stephen J. Semlow, Palos Park, IL (US)

(73) Assignee: The C. P. Hall Company, Chicago, IL (US)

( * ) Notice: Subject to any disclaimer, the term of this patent is extended or adjusted under 35 U.S.C. 154(b) by 0 days.

(21) Appl. No.: 10/434,616

(22) Filed: May 9, 2003

(65) Prior Publication Data

US 2004/0002563 A1 Jan. 1, 2004

Related U.S. Application Data

(63) Continuation-in-part of application No. 10/301,770, filed on Nov. 21, 2002, which is a continuation-in-part of application No. 10/144,229, filed on May 10, 2002.

(51) Int. Cl.$^7$ ................................................ C08K 5/10
(52) U.S. Cl. ...................... 524/315; 524/100; 524/306; 524/311; 525/332.5; 156/167
(58) Field of Search ................................ 524/305, 100, 524/315, 264; 525/332.4–332.9, 333.1–333.3

(56) References Cited

U.S. PATENT DOCUMENTS

| | | | |
|---|---|---|---|
| 2,940,949 A | 6/1960 | Mullin et al. ............... 260/31.4 |
| 3,256,362 A | 6/1966 | Craubner et al. ........... 260/862 |
| 3,825,515 A | 7/1974 | Lucas et al. ............ 260/31.8 M |
| 3,888,813 A | 6/1975 | Moult et al. ................ 260/29.3 |
| 3,968,198 A | 7/1976 | Honda et al. ................ 264/343 |
| 4,016,119 A | 4/1977 | Elmer ........................ 260/17.5 |
| 4,025,454 A | 5/1977 | Rouzier ....................... 252/182 |
| 4,026,744 A | 5/1977 | Elmer ..................... 156/110 A |
| 4,038,220 A | 7/1977 | Thompson ..................... 260/3 |
| 4,054,561 A | 10/1977 | Strauss et al. ............. 260/22 D |
| 4,061,835 A | 12/1977 | Poppe et al. ................ 428/522 |
| 4,078,114 A | 3/1978 | Aronoff et al. ............. 428/379 |
| 4,130,535 A | 12/1978 | Coran et al. .......... 260/33.6 AQ |
| 4,134,869 A | 1/1979 | Kalafus et al. .............. 260/293 |
| 4,376,711 A | 3/1983 | Shaub .................... 252/32.7 E |
| 4,448,813 A * | 5/1984 | Solomon ..................... 427/381 |
| 4,469,748 A | 9/1984 | Sharma ....................... 428/378 |
| 4,472,537 A | 9/1984 | Johnson et al. .............. 523/160 |
| 4,532,080 A | 7/1985 | Delseth et al. ............... 556/139 |
| 4,550,147 A | 10/1985 | Oohara .................... 525/332.6 |
| 4,605,590 A | 8/1986 | Delseth et al. ............... 428/295 |
| 4,645,788 A | 2/1987 | Okumoto et al. ........... 524/308 |
| 4,704,334 A | 11/1987 | Delseth et al. ............... 428/458 |
| 4,776,909 A | 10/1988 | Bohm et al. ................. 156/117 |
| 4,789,381 A * | 12/1988 | Oshiyama et al. ............ 8/115.6 |
| 4,859,215 A | 8/1989 | Langsam et al. ............... 55/16 |
| 4,978,392 A | 12/1990 | Kilbarger et al. ............. 106/95 |
| 4,978,716 A | 12/1990 | Flynn et al. ................. 525/195 |
| 5,057,566 A | 10/1991 | Kobayashi et al. .......... 524/297 |
| 5,169,716 A | 12/1992 | Croft et al. ................. 428/379 |
| 5,226,987 A | 7/1993 | Matsumoto et al. ..... 152/209 R |
| 5,246,051 A | 9/1993 | Inada et al. ................. 152/527 |
| 5,253,691 A | 10/1993 | Scriver ....................... 152/537 |
| 5,290,886 A | 3/1994 | Ellul ........................... 524/515 |
| 5,298,539 A * | 3/1994 | Singh et al. ................... 524/92 |
| 5,447,776 A | 9/1995 | Disselbeck ................... 428/178 |
| 5,455,075 A | 10/1995 | Longo ...................... 427/398.1 |
| 5,571,352 A | 11/1996 | Disselbeck ................... 152/526 |
| 5,604,277 A | 2/1997 | Osborn ........................ 524/270 |
| 5,616,657 A | 4/1997 | Imamura et al. ............. 525/437 |
| 5,792,805 A | 8/1998 | Williams ..................... 524/100 |
| 5,834,582 A | 11/1998 | Sinclair et al. ............... 528/354 |
| 5,891,938 A * | 4/1999 | Williams ..................... 524/100 |
| 5,900,448 A | 5/1999 | Wideman et al. ............ 524/419 |
| 5,985,963 A * | 11/1999 | D'Sidocky et al. .......... 524/105 |
| 6,127,512 A | 10/2000 | Asrar et al. .................. 528/272 |
| 6,138,731 A | 10/2000 | Miyazaki et al. ............ 152/532 |
| 6,255,367 B1 | 7/2001 | Bitler et al. .................. 523/522 |
| 6,262,180 B1 | 7/2001 | Klun et al. ................... 525/199 |
| 6,326,426 B1 | 12/2001 | Ellul ............................ 524/270 |
| 2002/0010275 A1 | 1/2002 | Maly et al. ................... 525/177 |
| 2003/0171471 A1 | 9/2003 | Pritschins et al. ............ 524/306 |

FOREIGN PATENT DOCUMENTS

| | | | |
|---|---|---|---|
| CA | 2408772 | 4/2003 | |
| EP | 1 022 306 A1 | 7/2000 | ............ C08K/5/10 |
| GB | 2 022 089 | 12/1979 | |

OTHER PUBLICATIONS

*Resorcinol Bonding Systems for Steel Cord Adhesion*, Peterson et al., Rubber World, Aug. 1984, pp. 24–27.
*Mechanics of Pneumatic Tires*, Clark, National Bureau of Standards Monograph 112, U.S. Dept. of Commerce, Nov. 1971, pp. 241–243 and 290–291.
International Search Report for PCT/US03/14411 dated Sep. 15, 2003.

* cited by examiner

*Primary Examiner*—Katarzyna Wyrozebski
(74) *Attorney, Agent, or Firm*—Mashall, Gerstein & Borun LLP

(57) ABSTRACT

A rubber composition including a natural or synthetic rubber, and an adhesive resin capable of unexpected adhesion to metal, polymer and glass substrates, particularly cords in radical tires, hoses, conveyor belts, transmission belts, and the like by the addition of a liquid composition containing long chain esters, including mono, di- and tri-mesters.

49 Claims, No Drawings

LIQUID ADHESION PROMOTER FOR CORD-REINFORCED RUBBER AND METAL OR POLYMER SUBSTRATE/RUBBER COMPOSITES

CROSS REFERENCE TO RELATED APPLICATIONS

This is a continuation-in-part of U.S. patent application Ser. No. 10/301,770, filed Nov. 21, 2002, which is a continuation-in-part of U.S. patent application Ser. No. 10/144,229, filed May 10, 2002, the entire respective disclosures of which are hereby incorporated by reference.

FIELD OF THE INVENTION

The present invention is directed to adhesion promoters for adhering elastomers, including natural and/or synthetic rubbers, to natural or synthetic polymeric cord or fabric substrates, and/or metal cord or metal substrates, particularly cords in the manufacture of cord-reinforced rubber articles, such as tires, hoses, conveyor belts, transmission belts, and the like.

BACKGROUND OF THE INVENTION

Many rubber articles, principally automobile tires, but also including hoses, conveyor belts, power train belts, e.g., transmission belts, and the like, are usually reinforced with fibrous or metal cords. In all such instances, the fiber must be firmly bonded to the rubber. This is so whether the fiber is a natural or synthetic polymer, or metallic, and whether the rubbers are natural or synthetic.

The conventional practice has been to prepare the fiber by pretreatment with a combination of hexamethoxymelamine or hexamethylene-tetramine and phenol-formaldehyde condensation product, wherein the phenol is almost always resorcinol. By a mechanism not completely understood, the resin reacts with the fiber and the rubber, effecting a firm reinforcing bond.

One method for preparing rubber compositions reinforced with cords entails compounding a vulcanizing rubber stock composition with the components of an adhesive resin condensation product. The components of the condensation product include a methylene acceptor and a methylene donor. The most commonly employed methylene acceptor is a phenol, such as resorcinol, while the most commonly employed methylene donor is a melamine, such as N-(substituted oxymethyl)melamine. The effect achieved is resin formation in-situ during vulcanization of the rubber, creating a bond between the metal or polymeric cords and the rubber, irrespective of whether the cords have been pretreated with an additional adhesive, such as a styrene-butadiene latex, polyepoxides with a blocked isocyanate, and the like.

Resorcinol-free vulcanizable rubber compositions are known. For example, U.S. Pat. No. 5,298,539 discloses vulcanizable rubber compositions containing uncured rubber, a vulcanizing agent and at least one additive selected from the group consisting of derivatives of melamine, acetoguanamine, benzoguanamine, cyclohexylguanamine and glycoluril monomer and oligomers of these monomers. These derivatives are substituted on average at two or more positions on the monomer or each unit of the oligomer with vinyl terminated radicals and the composition is free of resorcinol.

Another manner of eliminating resorcinol from vulcanizable rubber compositions has relied on the use of alternative coreactants. U.S. Pat. No. 4,038,220 describes a vulcanizable rubber composition which comprises a rubber, a filler material, N-(substituted oxymethyl)melamine and at least one of α- or β-naphthol. This reference employs the monohydric phenols, α- or β-naphthol, as methylene acceptors in the resin forming reaction during vulcanization in the absence of resorcinol. The use of resorcinol-formaldehyde resin to replace resorcinol in vulcanizable rubber compositions is also known. For example, see A. Peterson, et al., "Resorcinol Bonding Systems for Steel Cord Adhesion", Rubber World (August 1984).

An increased need in the industry for fiber reinforcing of rubber to survive high dynamic stress, such as flexing, to avoid tire belt separation has brought about a continuing search for other and better methods for achieving high adhesive strength.

Tires typically have a construction such that a carcass, edge portions of a belt, an under-belt pad and the like are intricately combined with each other in its shoulder portion. The under-belt pad provided continuously along the circumferential shoulder portion of the tire between a tread rubber portion and the carcass and extending outwardly of the belt edge portions along the width of the tire is a thick rubber layer, which is a structural characteristic for alleviating a shear stress possibly generated between the belt edge portions and the carcass. Further, since the under-belt pad is repeatedly subjected to loads during running, heat is liable to build-up in the under-belt pad, thereby causing internal rubber destruction in the under-belt pad and adhesion failures between the rubber components and between a rubber portion and cords (steel cords) in the carcass. This causes separation of the belt edge portions and ply separation in the carcass resulting in breakdown of the tire. One conventional approach to this problem is that the under-belt pad is formed of a rubber compound which contains a reduced amount of carbon black for suppression of heat build-up.

However, the rubber compound for the under-belt pad is softened by the reduction of the carbon black content therein. This also results in the adhesion failure and the internal rubber destruction in the under-belt pad due to the heat build-up, thereby causing the ply separation and the belt separation in the tire during running. Therefore, this approach is not satisfactory in terms of the durability of the tire. The deterioration of the durability of the tire which results from the heat build-up attributable to the structural characteristic of the under-belt pad is a more critical problem, since the recent performance improvement of automobiles requires that tires have a higher durability under higher speed running and heavy loads.

Despite their good abrasion resistance, radial tires become unusable sooner than bias tires because of the belt separation which takes place while the tread still remains. One way that this problem has been addressed is by improving the tread or steel cord-embedding rubber. For example, an improved tread is of dual layer structure, with the inner layer (base tread adjacent to the belt) being made of a rubber composition which is saved from heat generation at the sacrifice of abrasion resistance, and the outer layer (cap tread) being made of a rubber composition of high abrasion resistance. Also, an improved steel cord-embedding rubber is made of a rubber composition containing an adhesive such as a cobalt salt of an organic acid, hydroxybenzoic acid, and resorcinol, which increases adhesion between rubber and steel cord. These improvements, however, are not completely successful.

Other adhesion promoters have been used in an attempt to avoid belt separation, for example, special latices such as, for example, a vinyl-pyridine latex (VP latex) which is a copolymer of about 70% butadiene, about 15% styrene and about 15% 2-vinylpyridine. Examples of other latices which are present in adhesion promoters are acrylonitrile rubber latices or styrene-butadiene rubber latices. These can be used as such or in combination with one another. Especially suitable adhesion promoters for polyesters are also those which are applied in multi-stage processes, for instance a blocked isocyanate being applied in combination with poly-epoxide and the material then being treated using customary resorcinol-formaldehyde resins (RFL dip). It is also known to use combinations of RFL dips with other adhesion-promoting substances such as, for example, a reaction product of triallyl cyanurate, resorcinol and formaldehyde or p-chlorophenol, resorcinol and formaldehyde.

Not only is it necessary that adhesion between rubber and metal, e.g., steel or polymeric cord be high, but it is also necessary that a decrease in adhesion be as small as possible while tires are in use. In actuality, tires containing a steel cord-embedding rubber with good adhesion occasionally lose the initial adhesion to a great extent after use. The following are the possible reasons why adhesion between steel cord and rubber decreases while tires are in use:

(1) Tires are subject to many minute cuts when they run over gravel or sharp objects. The cuts reaching the inside of the tread permit air and moisture to infiltrate into the tire, promoting the aging and fatigue of the embedding rubber and also rusting the steel cord. All this leads to a decrease in adhesion.

(2) The adhesion improver incorporated into the steel cord-embedding rubber diffuses and migrates into the tread rubber during vulcanization or tire use. This leads to a decrease in adhesion.

(3) The softener and other additives incorporated into the tread migrate into the steel cord-embedding rubber. This also leads to a decrease in adhesion.

Despite the various proposals made to improve the adherence of cord to rubber in vulcanizable rubber compositions, there is a continuing need for commercially available cost effective additives that improve the adhesion of rubber to fibrous or metal cords in vulcanizable rubber compositions.

The adhesion promoter systems of the present invention far surpass any extant adhesion promoters known in the art for adhesion of metal and/or polymeric cord to vulcanizable rubber.

SUMMARY OF THE INVENTION

In brief, it has been found that the use of long chain esters formed by reacting mono, di-, and/or tri-carboxylic acids containing one, two, or three $C_6$–$C_{24}$ long chain radicals or fatty acid residues, and alcohols containing a $C_3$–$C_{24}$ alkyl group, in a natural or synthetic vulcanizable rubber, unexpectedly increases the adhesion between the rubber and a metal or polymeric substrate, such as metal or polymeric surfaces, particularly cords used in reinforcing rubber in tires, hoses, conveyor belts, motor mounts, automotive drive train belts, including transmission belts, and the like, when added with an adhesive resin, such as a melamine-containing resin or a phenol-, e.g., resorcinol-containing resin, e.g., a Novolak resin. Examples of suitable substrates include steel, brass-coated steel, brass, polyester, Aramid, textiles, copper, glass, and the like. Application of the adhesive promoters of the invention is particularly contemplated with steel cord, brass-coated steel cord, brass cord, polyester fiber cord, Aramid fiber cord, glass cord, fabric and flat metal surfaces, and the like. While these resins have been used before to adhere metal tire cord to a vulcanizable rubber, and theoretically bond the rubber to the resin, surprisingly good adhesion has been found by additionally adding one or more long chain mono-, di-, and/or tri-esters, particularly dimerate esters reacted from $C_{18}$ fatty acids, and $C_3$–$C_{24}$ alcohols, preferably, $C_3$–$C_{18}$ alcohols, more preferably $C_6$–$C_{18}$ alcohols. Preferably, the esters provide unexpected, tenacious bonding between polymeric or metal cord and rubber, when combined with an adhesive resin. It is theorized that the long chain esters of the invention strongly adhere both to the rubber and to the resin, with the resin providing sufficient ionic bonding to the reinforcing cords.

One aspect of the composition and articles described herein is to provide a radial tire for heavy load vehicles characterized by good adhesion between steel or polymeric cord and steel cord-embedding rubber, said adhesions lasting for a long time with only a small loss of adhesion while tires are in use. Another aspect of the compositions and articles described herein is to provide a radial tire for vehicles and other cord-embedded rubber articles which are superior in cord adhesion to rubber.

DETAILED DESCRIPTION OF THE PREFERRED EMBODIMENTS

The adhesion promoter systems of the invention include at least one long chain ester compound and at least one adhesive resin. The adhesion promoter systems are useful for improving the adhesion of rubber to metal and polymeric substrates, particularly metal and polymeric cord. Surprisingly, the adhesion promoter systems disclosed herein significantly increase the adhesion of rubber compositions to such metal and polymeric substrates. In the description, the terms "adhesion promoter system" and "adhesion promoter" may be used interchangeably.

In the adhesion promoter systems of the invention, long chain esters are typically added to natural or synthetic rubber with a vulcanizing agent and an adhesive resin. The adhesion promoter systems may be added to a natural and/or synthetic rubber(s), as a neat liquid, in order to promote adhesion. Typically, however, the adhesion promoters are mixed with a dry carrier, such as calcium silicate, to form an alternative delivery system, which can be incorporated into natural and/or synthetic rubber(s). In such a method, the carrier facilitates delivery of the active adhesion promoting agents to the rubber(s). In yet another refinement of the invention, the adhesion promoter may be formulated as a "polymer masterbatch." According to this aspect of the invention, a pellet comprising polymer (about 6 wt. % to about 20 wt. %), filler or inert ingredients (about 0 wt. % to about 14 wt. %), with the balance being an adhesion promoter system (i.e., at least one ester compound in accordance with formulas I–IV and at least one adhesive resin such as melamine) is added to a natural or synthetic rubber. Typically, the masterbatch polymer and the rubber to which the masterbatch polymer is added are miscible. Preferably, the masterbatch polymer and the rubber are the same.

Throughout the specification, the adhesion promoter systems are generally used in an amount between about 0.2% by weight and about 30% by weight. Typically, each component of an adhesion promoter system of the invention (i.e., an ester in accordance with formulas I–IV and an adhesive resin) is present in an amount between about 0.1% and about 15% by weight, usually between about 1 wt. % and about 10 wt. %, and most preferably between about 2 wt. % and about 8 wt. %, based on the weight of natural and synthetic rubber in the composition.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The long chain esters may be monoesters, diesters, triesters, or mixtures thereof, that may include saturated or unsaturated hydrocarbon chains, straight chain or branched having none, one, two or three double bonds in the hydrocarbon chains.

The monoesters have a formula I, as follows:

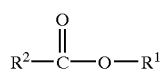

(I)

wherein $R^1$ is a $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds. $R^2$ is a $C_3$–$C_{24}$, preferably $C_6$–$C_{24}$, more preferably $C_8$–$C_{18}$ saturated hydrocarbon, or an unsaturated hydrocarbon having 1 to 6, preferably 1 to 3 carbon-to-carbon double bonds.

The diesters have a formula II or III, as follows:

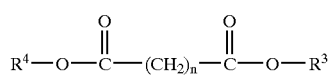

(II)

wherein n=3–24, preferably 6–18, and more preferably 3–10, and $R^3$ and $R^4$, same or different, are $C_3$–$C_{24}$ alkyl, preferably $C_3$–$C_{18}$ alkyl, more preferably $C_6$–$C_{18}$ alkyl radicals, straight chain or branched, saturated or unsaturated containing 1 to 3 carbon-to-carbon double bonds.

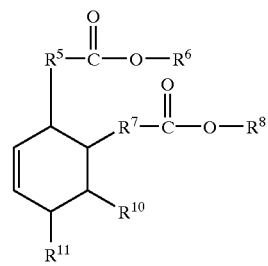

(III)

wherein $R^5$ and $R^7$, same or different, are $C_3$–$C_{24}$ alkyl, preferably $C_6$–$C_{24}$ alkyl, more preferably $C_8$–$C_{18}$ alkyl, straight chain or branched, either saturated or containing 1 to 6, preferably 1 to 3, carbon-to-carbon double bonds;

$R^6$ and $R^8$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and $R^{10}$ and $R^{11}$, same or different, are $C_3$–$C_{24}$ saturated hydrocarbon chains, preferably $C_3$–$C_{18}$, more preferably $C_6$–$C_{18}$, straight chain or branched; or unsaturated $C_3$–$C_{24}$ hydrocarbon chains, preferably $C_3$–$C_{18}$, more preferably $C_6$–$C_{18}$, straight chain or branched, containing 1 to 6, preferably 1 to 3, carbon-to-carbon double bonds.

The triesters have a formula IV, as follows:

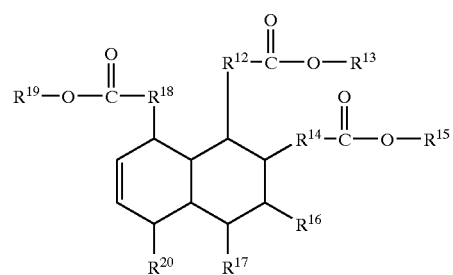

(IV)

wherein $R^{12}$, $R^{14}$ and $R^{18}$, same or different, are $C_3$–$C_{24}$ alkyl, preferably $C_6$–$C_{24}$ alkyl, more preferably $C_8$–$C_{18}$ alkyl, straight chain or branched, either saturated or containing 1 to 6, preferably 1 to 3, carbon-to-carbon double bonds;

$R^{13}$, $R^{15}$ and $R^{19}$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and $R^{16}$, $R^{17}$ and $R^{20}$, same or different, are $C_3$–$C_{24}$ saturated hydrocarbon chains, preferably $C_3$–$C_{18}$, more preferably $C_6$–$C_{18}$, straight chain or branched; or unsaturated $C_3$–$C_{24}$ hydrocarbon chains, preferably $C_3$–$C_{18}$, more preferably $C_6$–$C_{18}$ straight chain or branched, containing 1 to 6, preferably 1 to 3, carbon-to-carbon double bonds.

The fatty acid residues or hydrocarbon chains $R^2$, $R^5$, $R^7$, $R^{12}$, $R^{14}$ and $R^{18}$ of the esters of formulas I, II, III, and IV can be any $C_3$–$C_{24}$, preferably $C_6$–$C_{24}$, more preferably $C_8$–$C_{18}$, hydrocarbon chain, either saturated or containing 1 to 6, preferably 1 to 3, carbon-to-carbon double bonds, derived from animal or vegetable fatty acids such as butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; and/or tung. Examples are the hydrocarbon chain residues from the following fatty acids, where the number in parentheses indicates the number of carbon atoms, and the number of double bonds, e.g., ($C_{24-6}$) indicates a hydrocarbon chain having 24 carbon atoms and 6 double bonds: Hexanoic ($C_{6-0}$); Octanoic ($C_{8-0}$); Decanoic ($C_{10-0}$); Dodecanoic ($C_{12-0}$); 9-Dodecenoic (CIS) ($C_{12-1}$); Tetradecanoic ($C_{14-0}$); 9-Tetradecenoic (CIS) ($C_{14-1}$); Hexadecanoic (CIS) ($C_{16-0}$); 9-Hexadecenoic (CIS) ($C_{16-1}$); Octadecanoic ($C_{18-0}$); 9-Octadecenoic (CIS) ($C_{18-1}$); 9-Octadecenoic, 12-Hydroxy-(CIS) ($C_{18-2}$); 9, 12-Octadecadienoic (CIS, CIS) ($C_{18-2}$); 9, 12, 15 Octadecatrienoic (CIS, CIS, CIS) ($C_{18-3}$); 9, 11, 13 Octadecatrienoic (CIS, TRANS, TRANS) ($C_{18-3}$); 9, 11, 13 Octadecatrienoic, 4-Oxo (CIS, TRANS, TRANS) ($C_{18-3}$); Octadecatetrenoic ($C_{18-4}$); Eicosanoic ($C_{20}$); 11-Eicosenoic (CIS) ($C_{20-1}$); Eicosadienoic ($C_{20-2}$); Eicosatrienoic ($C_{20-3}$); 5, 8, 11, 14 Eicosatetraenoic ($C_{20-4}$); Eicosapentaenoic ($C_{20-5}$); Docosanoic ($C_{22}$); 13 Docosenoic (CIS) ($C_{22-1}$); Docosatetraenoic ($C_{22-4}$); 4, 8, 12, 15, 19 Docosapentaenoic ($C_{22-5}$); Docosahexaenoic ($C_{22-6}$); Tetracosenoic ($C_{24-1}$); and 4, 8, 12, 15, 18, 21 Tetracosahexaenoic ($C_{24-6}$).

Examples of particularly useful diesters of formula II include a saturated diester formed by the reaction of sebacic acid and 2-ethylhexyl alcohol:

Useful cyclic diesters falling within formula III include dimerate ester structures formed by the reaction of a $C_{36}$ dimer acid derived from tall oil fatty acids and $C_3$–$C_{24}$, preferably $C_3$–$C_{18}$, more preferably $C_6$–$C_{18}$ alcohol, straight chain or branched, saturated or unsaturated containing 1 to 3 carbon-to-carbon double bonds. Examples of such cyclic esters include the following structures, wherein the dimer acid corresponding to structure A is formed by self reaction of linoleic acid, the dimer acid corresponding to structure B is formed by reacting linoleic acid with oleic acid, and the dimer acid corresponding to structure C is formed by reacting linoleic acid with linolenic acid:

(A)

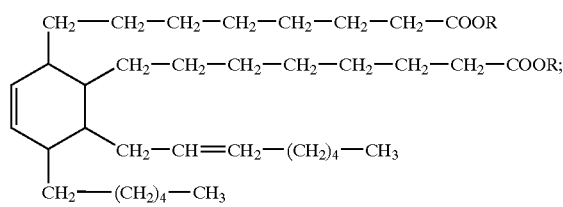

(B)

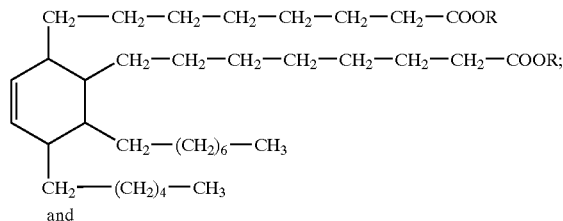

and

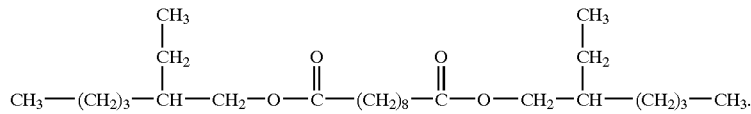

Other useful diesters falling within formula II include the saturated diester formed by the reaction of sebacic acid with tridecyl alcohol,

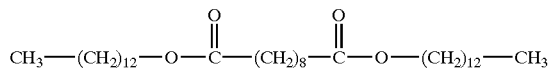

and the unsaturated diester formed by reaction of sebacic alcohol with oleyl alcohol:

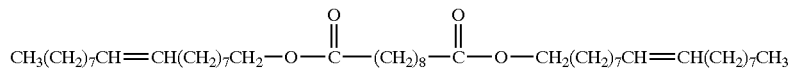

(C)

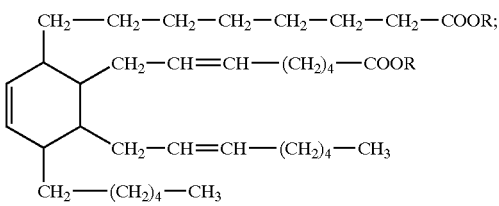

wherein each R, same or different, in formulas (A), (B), and (C) is a $C_3$–$C_{24}$ radical, preferably $C_3$–$C_{18}$, more preferably $C_6$–$C_{18}$, straight chain or branched, saturated or unsaturated containing 1 to 3 carbon-to-carbon double bonds. RX-13804 is another example of an unsaturated diester (dimerate ester) formed by the reaction of a predominantly $C_{36}$ dimer acid reacted with 2-ethylhexyl alcohol. RX-13824 is an additional unsaturated diester (dimerate ester) formed by the reaction of a predominantly $C_{36}$ dimer acid with tridecyl alcohol.

A representative example of the triester (trimerate ester) of formula IV is the following structure (D);

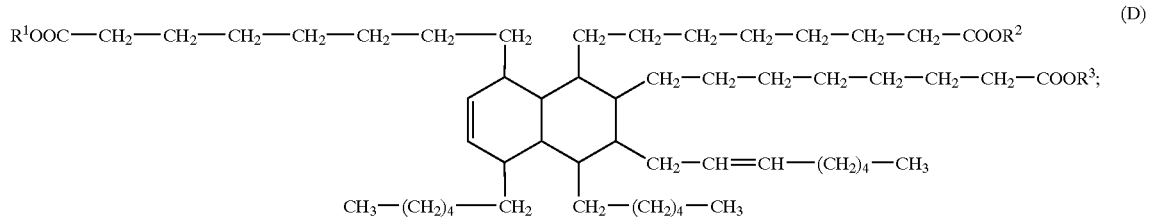

(D)

wherein each $R^1$, $R^2$, and $R^3$, same or different, is a $C_3$–$C_{24}$ radical, preferably $C_3$–$C_{18}$, more preferably $C_6$–$C_{18}$, straight chain, or branched, saturated or unsaturated containing 1 to 3 carbon-to-carbon double bonds.

A particularly useful blend of long chain esters is formed from blends of mono, dimer, and trimer acids, for example, products having CAS#: 61788-89-4. Esters prepared from such products are blends including, primarily, the above $C_{36}$ and $C_{54}$ dimerate and trimerate esters (A), (B), (C) and (D), shown in the above structures, that is predominantly (more than 50% by weight) the $C_{36}$ dimerate esters (A), (B) and (C).

Commercially available blends of useful polybasic acids that can be reacted with $C_3$–$C_{24}$, preferably $C_3$–$C_{18}$, more preferably $C_6$–$C_{18}$ alcohols, straight chain or branched, saturated or unsaturated containing 1 to 3 carbon-to-carbon double bonds to produce the dimerate and trimerate esters, as blends, include the following: EMPOL® 1010 Dimer Acid; EMPOL® 1014 Dimer Acid; EMPOL® 1016 Dimer Acid; EMPOL® 1018 Dimer Acid; EMPOL® 1022 Dimer Acid; EMPOL® 1024 Dimer Acid; EMPOL® 1040 Trimer Acid; EMPOL® 1041 Trimer Acid; EMPOL® 1052 Polybasic Acid; and similar PRIPOL™ products from Uniqema as well as UNIDYME® products from Arizona Chemical.

Particularly useful long chain ester additives are made by reacting any of the long chain mono, dimer and/or trimer acids with one or more straight chain or branched $C_3$–$C_{24}$, preferably $C_3$–$C_{18}$, more preferably $C_6$–$C_{18}$ alcohols to produce the esters of formulas I, II, III and IV. The above dimer, trimer, and polybasic acids are produced by dimerizing, trimerizing, and polymerizing (oligomerizing) long chain carboxylic acids from the above-mentioned fatty acids. The fatty acids may be mixtures. Accordingly, the dimer acid produced by dimerizing a $C_{18}$ carboxylic acid (typically, a mixture of stearic, oleic, linoleic, and linolenic), after esterification, will result in a blend of numerous dimerate and trimerate esters in accordance with formulas III and IV, including saturated and unsaturated esters (i.e., some long chain esters may contain hydrocarbon chains having 1 to 6, generally 1 to 3, carbon-to-carbon double bonds). Any one, or any blend, of the esters of formulas I, II, III and/or IV, when combined with an adhesive resin, will function to increase the adhesion of natural or synthetic rubber to metal or polymeric cord, metal or polymeric substrates, such as polymeric woven or non-woven fabrics, and metal flat stock materials.

The adhesion promoters include an adhesive resin, which preferably is a condensation product of a formaldehyde or methylene donor and a formaldehyde or methylene acceptor, either pre-condensed, or condensed in-situ while in contact with the rubber. The term "methylene donor" is intended to mean a compound capable of reacting with a methylene acceptor (such as resorcinol or its equivalent containing a reactive hydroxyl group) and generate the resin outside of the rubber composition, or in-situ. Preferably, the components of the condensation product include a methylene acceptor and a methylene donor. The most commonly employed methylene acceptor is a phenol, such as resorcinol, while the most commonly employed methylene donor is a melamine, such as N-(substituted oxymethyl) melamine. The effect achieved is resin formation in-situ during vulcanization of the rubber, creating a bond between the metal or polymeric cords and the rubber, irrespective of whether the cords have been pretreated with an additional adhesive, such as a styrene-butadiene latex, polyepoxides with a blocked isocyanate, and the like. The long chain ester additive/resin combinations described herein are particularly useful with steel cord, where adhesive pretreatment has been largely ineffective.

Examples of methylene donors which are suitable for use in the rubber compositions disclosed herein include melamine, hexamethylenetetramine, hexaethoxymethylmelamine, hexamethoxymethylmelamine, lauryloxymethyl-pyridinium chloride, ethoxymethylpyridinium chloride, trioxan hexamethoxy-methylmelamine, the hydroxy groups of which may be esterified or partly esterified, and polymers of formaldehyde, such as paraformaldehyde. In addition, the methylene donors may be N-substituted oxymethylmelamines, of the general formula:

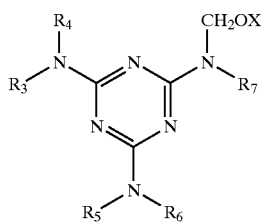

wherein X is an alkyl having from 1 to 8 carbon atoms $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis(methoxymethyl)melamine; N,N', N"trimethyl/N,N',N"-trimethylol-melamine; hexamethylolmelamine; N,N',N"-dimethylolmelamine; N-methylolmelamine; NN'-dimethylolmelamine; N,N',N"-tris(methoxymethyl)melamine; and N,N',N"-tributyl-N,N',N"-trimethylol-melamine. The N-methylol derivatives of melamine are prepared by known methods.

The amount of methylene donor and methylene acceptor, pre-condensed or condensed in-situ, that are present in the rubber composition may vary. Typically, the amount of pre-condensed methylene donor and methylene acceptor is present will range from about 0.1% to about 15.0%; or each can be added separately in an amount of about 0.1% to about 10.0%, based on the weight of natural and/or synthetic rubber in the composition. Preferably, the amount of each of a methylene donor and methylene acceptor added for in-situ condensation ranges from about 2.0% to about 5.0%, based on the weight of natural and/or synthetic rubber in the composition. The weight ratio of methylene donor to the methylene acceptor may vary. Generally speaking, the weight ratio will range from about 1:10 to about 10:1. Preferably, the weight ratio ranges from about 1:3 to 3:1.

Resorcinol-free vulcanizable rubber compositions also are useful in the rubber compositions described herein. For example, resorcinol-free adhesive resins and adhesive compounds useful in the adhesion promoter systems (i.e., when combined with the long chain esters described herein) include those described in U.S. Pat. Nos. 5,891,938 and 5,298,539, both hereby incorporated by reference. The '938 patent discloses vulcanizable rubber compositions containing an uncured rubber and a self-condensing alkylated triazine resin having high imino and/or methylol functionality. U.S. Pat. No. 5,298,539 discloses rubber additives which are substituted derivatives based on cyclic nitrogen compounds such as melamine, acetoguanamine, cyclohexylguanamine, benzoguanamine, and similar alkyl, aryl or aralkyl substituted melamines, glycoluril and oligomers of these compounds. In particular, the adhesive resins and adhesive compounds which are useful as the adhesive resins in the rubber compositions described herein include the following: adhesive resins selected from the group consisting of derivatives of melamine, acetoguanamine, benzoguanamine, cyclohexylguanamine and glycoluril monomers and oligomers of these monomers, which have been substituted on average at two or more positions on the monomer or on each unit of the oligomer with vinyl terminated radicals, the vulcanizable rubber composition being free of resorcinol; and, these derivatives which have been further substituted on average at one or more positions with a radical which comprises carbamylmethyl or amidomethyl.

Further, the adhesive resin can be any of the compounds of the following formulas:

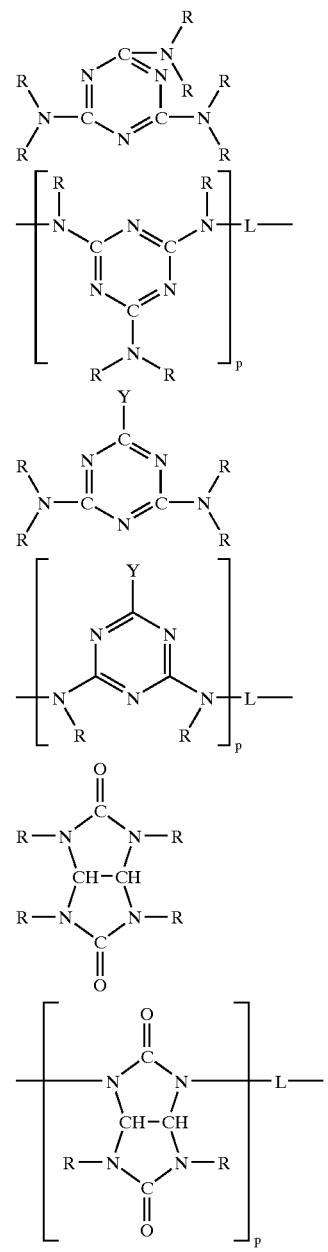

and positional isomers thereof,
wherein, in each monomer and in each polymerized unit of the oligomers, Y is selected from methyl, phenyl and cyclohexyl, and, on average,
at least two R are —$CH_2$-$R^1$,
and any remaining R are H, and
at least 2 $R^1$ are radicals selected from:

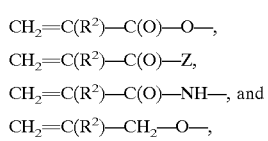

wherein $R^2$ is hydrogen or $C_1$–$C_{18}$ alkyl, and Z is a radical selected from:

—O—CH₂—CH₂—O—,

—O—CH₂—CH(CH₃)—O—,

—O—CH₂—CH₂—CH₂—O—, and

—O—CH(C₂H₅)—O—, and any remaining $R^1$ radicals are selected from

—O-R³,

—NH—C(O)—OR⁴, and

—NH—C(O)-R⁴, and wherein $R_3$ is hydrogen or $R_4$, and
$R_4$ is a $C_1$–$C_{18}$ alkyl, alicyclic, hydroxyalkyl, alkoxyalkyl or aromatic radical, and
in the oligomers,
P is 2 to about 10, and
L is methylene or the radical

—CH₂—O—CH₂—.

These adhesive compounds are particularly useful, wherein on average at least one $R^1$ in each monomer or in each oligomerized unit is —NH—C(O)—OR⁴, particularly the compounds of the following formulas:

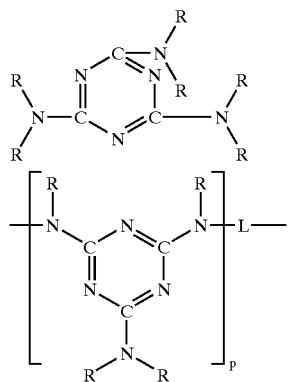

Particularly useful adhesive resins include the above formulas wherein on average, at least one R radical in each monomer or in each oligomerized unit is

—CH₂—NH—C(O)—OR⁴, wherein $R^4$ is a $C_1$–$C_{18}$ alkyl, alicyclic, hydroxyalkyl, alkoxyalkyl or aromatic radical, and wherein, on average, at least two R radicals are selected from

CH₂=C(CH₃)—C(O)O—C₃H₆—O—CH₂— and

CH₂=CH₂—C(O)O—C₂H₄—O—CH₂— and at least one R radical is selected from

—CH₂—NH—C(O)—O—CH₃, and

—CH₂—NH—C(O)—O—C₃H₇.

These adhesive resins and compounds can include additional additives, particularly those selected from hydroxymethylated and alkoxymethylated (alkoxy having 1–5 carbon atoms) derivatives of melamine, acetoguanamine, benzoguanamine, cyclohexylguanamine and glycoluril and their oligomers.

Additional adhesive resins useful in the rubber compositions described herein include self-condensing alkylated triazine resins selected from the group consisting of (i), (ii), and (iii):

(i) a self-condensing alkylated triazine resin having at least one of imino or methylol functionality and represented by the formula (I)

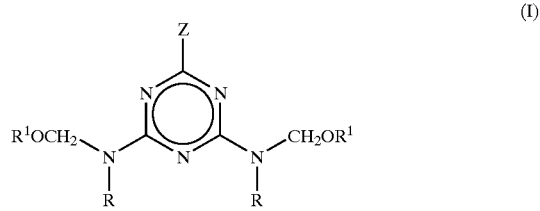

(ii) an oligomer of (i), or
(iii) a mixture of (i) and (ii), wherein
Z is —N(R)(CH₂OR¹), aryl having 6 to 10 carbon atoms, alkyl having 1 to 20 carbon atoms or an acetyl group,
each R is independently hydrogen or —CH₂OR¹, and
each $R^1$ is independently hydrogen or an alkyl group having 1 to 12 carbon atoms,
provided that at least one R is hydrogen or —CH₂OH and at least one $R^1$ is selected from the alkyl group; and
wherein the vulcanizable rubber composition is substantially free of methylene acceptor coreactants.

These adhesive resins are particularly useful wherein at least one R group is hydrogen and/or wherein at least one $R^1$ group is a lower alkyl group having 1 to 6 carbon atoms, particularly where the adhesive resin is a derivative of melamine, benzoguanamine, cyclohexylguanamine, or acetoguanamine, or an oligomer thereof.

One particularly useful alkylated triazine adhesive resin of the above formula is wherein Z is —N(R)(CH₂OR¹).

Another manner of eliminating resorcinol in an adhesive resin for rubber compositions, also useful herein, is N-(substituted oxymethyl)melamine and at least one of α- or β-naphthol. This adhesive resin employs the monohydric phenols, α- or β-naphthol, as methylene acceptors in the resin forming reaction during vulcanization in the absence of resorcinol.

Other adhesive resins useful in the rubber compositions described herein include special latices such as, for example, a vinyl-pyridine latex (VP latex) which is a copolymer of about 70% butadiene, about 15% styrene and about 15% 2-vinylpyridine; acrylonitrile rubber latices; and styrene-butadiene rubber latices. These can be used as such or in combination with one another. Another suitable adhesive resin useful herein, particularly for polyesters, are those which are applied in multi-stage processes, for instance a blocked isocyanate being applied in combination with polyepoxide and the material then being treated using customary resorcinol-formaldehyde resins (RFL dip). Additional useful adhesive resins include combinations of RFL dips with other adhesion-promoting substances such as, for example, a reaction product of triallyl cyanurate, resorcinol and formaldehyde or p-chlorophenol, resorcinol and formaldehyde.

Other suitable adhesive resins for use in the rubber and adhesion promoters described herein include polyurethane resins, epoxy resins, phenol aldehyde resins, polyhydric phenol aldehyde resins, phenol furfural resins, xylene aldehyde resins, urea formaldehyde resins, melamine formaldehyde resins, alkyd resins, polyester resins, and the like.

Typically, in the adhesion promoter systems, at least one ester compound in accordance with formulas I–IV is combined with an adhesive resin in a weight ratio between about 10 parts ester to about 1 part adhesive resin (i.e., a ratio of about 10:1, ester to resin, respectively) and about 1 part ester to about 10 parts resin (i.e., a ratio of about 1:10, ester to resin, respectively). More preferably, the esters are combined with an adhesive resin in a weight ratio between about 4 parts ester to about 1 part adhesive resin and about 1 part ester to about 4 parts resin. Most preferably, the ratio of ester to adhesive resin is approximately one to one in the adhesion promoter systems of the invention.

The initial work with the long chain esters involved testing the esters in industrial rubber belts containing polyester cords for automotive power train systems. An important part of the construction of automotive belts is the bonding of the rubber to polyester cord. Polyester cord is used to provide strength and longevity to the belts. The polymer of choice for automotive belts is ethylene/propylene/diene polymer (EPDM). This polymer is excellent for the end use, but one of its drawbacks is poor adhesion to many substrates, such as polyester cord. Rubber companies go to great lengths to insure the proper adhesion between the EPDM and the polyester cord. At present, they use a treated cord that has a resorcinol-formaldehyde resin coating, and the resin-coated cords are then dipped in an adhesive. The resin-treated, adhesive coated cord is then bonded to the EPDM during the curing process. This is a time-consuming and expensive method to achieve rubber-to-polyester cord adhesion. The adhesion promoter systems of the invention advantageously improve adhesion of polyester cord to EPDM.

Other examples of substrates which are contemplated for use in the inventive compositions and methods include metal and polymeric layers, films, sheets, fibers, yarns and/or fabrics, including textiles, polyesters, and Aramid fibers. Metals for use in the invention include steel, brass-coated steel, brass, and copper. Adhesion to glass substrates can also be improved. Application of the adhesion promoters of the invention is particularly contemplated with steel cord, brass-coated steel cord, brass cord, polyester fiber cord, Aramid fiber cord, glass cord, fabric and flat metal surfaces, and the like. In the present application the term polymeric "cord" or "cords" is intended to include reinforcing elements used in rubber products including fibers, continuous filaments, staple, tow, yarns, fabric and the like, particularly cords for use in building the carcasses of tires such as truck tires.

The polymeric reinforcing element or cord comprises a plurality of substantially continuous fibers or monofilaments, including glass compositions, polyesters, polyamides and a number of other materials, useful in making the fibers for the reinforcing element or cords for polymeric rubber compositions and products are well known in the art. One of the preferred glasses to use is a glass known as E glass and described in "Mechanics of Pneumatic Tires," Clark, National Bureau of Standards Monograph 122, U.S. Dept. of Commerce; issued November 1971, pages 241–243, 290 and 291, incorporated herein by reference. The number of filaments or fibers employed in the fiber reinforcing element or cord can vary considerably depending on the ultimate use or service requirements. Likewise, the number of strands of fibers used to make a fiber reinforcing element or cord can vary widely. In general, the number of filaments in the fiber reinforcing element or cord for a passenger car tire can vary from about 500 to 3,000 and the number of strands in the reinforcing element can vary from 1 to 10. Preferably the number of strands is from 1 to 7 and the total number of filaments about 2,000. A representative industry glass tire cord known as G-75 (or G-75, 5/0) has 5 strands each with 408 glass filaments. Another representative cord known as G-15 has a single strand containing 2,040 glass filaments.

The adhesive promoters of the invention can be used in numerous applications, including bonding the steel braid to the natural and/or synthetic rubber material of hoses and the metal housing of motor mounts.

The term "vulcanization" used herein means the introduction of three dimensional cross-linked structures between rubber molecules. Thus, thiuram vulcanization, peroxide vulcanization, quinoid vulcanization, resin vulcanization, metal salt vulcanization, metal oxide vulcanization, polyamine vulcanization, radiation vulcanization, hexamethylenetetramine vulcanization, urethane cross-linker vulcanization and the like are included in addition to sulfur vulcanization which is usual and most important.

Rubbers useful in the compositions described herein can be natural rubbers (NR) and/or synthetic rubbers.

Synthetic rubbers include homopolymers of conjugated diene compounds, such as isoprene, butadiene, chloroprene and the like, for example, polyisoprene rubber (IR), polybutadiene rubber (BR), polychloroprene rubber and the like; copolymers of the above described conjugated diene compounds with vinyl compounds, such as styrene, acrylonitrile, vinyl pyridine, acrylic acid, methacrylic acid, alkyl acrylates, alkyl methacrylates and the like, for example, styrene-butadiene copolymeric rubber (SBR), vinylpyridine-butadiene-styrene copolymeric rubber, acrylonitrile-butadiene copolymeric rubber, acrylic acid-butadiene copolymeric rubber, methacrylic acid-butadiene copolymeric rubber, methyl acrylate-butadiene copolymeric rubber, methyl methacrylate-butadiene copolymeric rubber, acrylonitrile-butadiene-styrene terpolymer, and the like; copolymers of olefins, such as ethylene, propylene, isobutylene and the like with dienes, for example isobutylene-isoprene copolymeric rubber (IIR); copolymers of olefins with non-conjugated dienes (EPDM), for example, ethylene-propylene-cyclopentadiene terpolymer, ethylene-propylene-5-ethylidene-2-norbornene terpolymer and ethylene-propylene-1,4-hexadiene terpolymer; polyalkenamer obtained by ring opening polymerization of cycloolefins, for example, polypentenamer; rubbers obtained by ring opening polymerization of oxirane ring, for example, polyepichlorohydrin rubber and polypropylene oxide rubber which can be vulcanized with sulfur, silicone rubbers, and the like.

Furthermore, halides of the above-described various rubbers, for example, chlorinated isobutylene-isoprene copolymeric rubber (CI-IIR), brominated isobutylene-isoprene copolymeric rubber (Br-IIR), fluorinated polyethylene, and the like are included.

Particularly, the compositions described herein are characterized in that the surfaces of the vulcanized rubbers of natural rubber (NR), and synthetic rubbers, e.g. styrene-butadiene copolymeric rubber (SBR), polybutadiene rubber (BR), polyisoprene rubber (IR), isobutylene-isoprene, copolymeric rubber, halides of these rubbers (CI-IIR, Br-IIR) and copolymers (EPDM) of olefins with non-conjugated dienes, which are poor in the adhering ability, are improved to provide them a high adhering ability. Of course, the present invention can be applied to the other rubbers. All these rubbers may be kneaded with compounding agents conventionally used for compounding with rubber, for example, fillers, such as carbon black, silica, calcium carbonate, lignin and the like, softening agents, such as mineral oils, vegetable oils, prior to the vulcanization and then vulcanized.

The vulcanized rubbers, the surface of which has been treated with the adhesion promoter systems described herein can be easily adhered to the other materials, together with an adhesive resin, particularly metals and polymers, particularly in cord form.

In order to cure a rubber composition a vulcanizing agent such as a sulfur or peroxide vulcanizing agent is dispersed throughout the composition. The vulcanizing agent may be used in an amount ranging from 0.5 to 6.0%, based on the weight of the natural and/or synthetic rubbers in the composition, with a range of from 1.0 to 4.0% being preferred. Representative examples of sulfur vulcanizing agents include elemental sulfur ($S_8$), an amine disulfide, polymeric polysulfide and sulfur olefin adducts. Preferably, the sulfur vulcanizing agent is elemental sulfur.

Other suitable vulcanizing agents include thiuram, quinoid, metal salt, metal oxide, polyamine, vulcanization, radiation, hexamethylenetetramine, urethane cross-linker, and the like. Typical examples of peroxide vulcanizing agents include dibenzoyl peroxide and di(tertiary-butyl) peroxide.

The commonly employed carbon blacks used in conventional rubber compounding applications can be used as the carbon black in this invention. Representative examples of such carbon blacks include N110, N121, N220, N231, N234, N242, N293, N299, S315, N326, N330, M332, N339, N343, N347, N351, N358 and N375.

The rubber compositions described herein are compounded by methods generally known in the rubber compounding art, such as mixing the various sulfur-vulcanizable or peroxide-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants, retarders and peptizing agents. As known to those skilled in the art, the additives mentioned above are selected and commonly used in conventional amounts for tire tread applications. Typical amount of adhesive resins, comprise about 0.2 to about 10%, based on the weight of natural and/or synthetic rubbers, usually about 1 to 5%.

Typical amounts of zinc oxide comprise about 2 to about 5%. Typical amounts of waxes comprise about 1 to about 5% based on the weight of natural and/or synthetic rubbers. Often microcrystalline waxes are used. Typical amounts of retarders range from 0.05 to 2%. Typical amounts of peptizers comprise about 0.1 to 1%. Typical peptizers may be, for example, pentachlorothiophenol and dibenzamidodiphenyl disulfide. All additive percentages are based on the weight of natural and/or synthetic rubbers.

Accelerators may be used to control the time and/or temperature required for vulcanization and to improve the properties of the vulcanizate. The accelerator(s) may be used in total amounts ranging from about 0.5 to about 4%, preferably about 0.8 to about 1.5%, based on the weight of natural and/or synthetic rubbers. Suitable types of accelerators that may be used are amines, disulfides, guanidines, thioureas, thiazoles, thiurams, sulfenamides, dithiocarbamates and xanthates. If included in the rubber composition, the primary accelerator preferably is a sulfenamide. If a second accelerator is used, the secondary accelerator is preferably a guanidine, dithiocarbamate or thiuram compound.

When the adhesion promoter systems containing a long chain ester and an adhesive resin are used as a wire coat or bead coat, e.g., for use in a tire, the adhesion promoter system typically does not include an organo-cobalt compound, and may be used in whole or as a partial replacement for an organo-cobalt compound which serves as a wire adhesion promoter. When used in part, any of the organo-cobalt compounds known in the art to promote the adhesion of rubber to metal also may be included. Thus, suitable organo-cobalt compounds which may be employed, in combination with the non-cobalt adhesion promoter systems containing long chain esters described herein, include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate; cobalt carboxylate and an organo-cobalt-boron complex commercially available under the designation Comend A from Shepherd Chemical Company, Cincinnati, Ohio. Comend A is believed to have the structure:

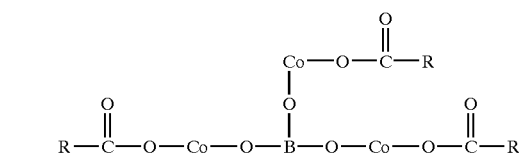

wherein each R, same or different, is an alkyl group having from 9 to 12 carbon atoms, and B is a hydrocarbon chain, $C_4$–$C_{24}$, straight chain or branched, saturated or unsaturated.

Amounts of organo-cobalt compound which may be employed depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound utilized on the amount of cobalt metal desired in the finished composition. Accordingly, it may in general be stated that if an organo-cobalt compound is included in the rubber composition, the amount of organo-cobalt compound present in the stock composition should be sufficient to provide from about 0.01 percent to about 0.35 percent by weight of cobalt metal based upon total weight of the rubber in the composition, with the preferred amounts being from about 0.03 percent to about 0.2 percent by weight of cobalt metal based on the total weight of rubber in the composition.

The adhesion promoters described herein are especially effective in compositions in which the rubber is cis-polyisoprene, either natural or synthetic, and in blends containing at least 25% by weight of cis-polyisoprene with other rubbers. Preferably the rubber, if a blend, contains at least 40% and more preferably at least 60% by weight of cis-polyisoprene. Examples of other rubbers which may be blended with cis-polyisoprene include poly-1,3-butadiene, copolymers of 1,3-butadiene with other monomers, for example styrene, acrylonitrile, isobutylene and methyl methacrylate, ethylene/propylene/diene terpolymers, and halogen-containing rubbers such as chlorobutyl, bromobutyl and chloroprene rubbers.

The amount of sulphur in the composition is typically from 2 to 8 parts, for example from 3 to 6, by weight per 100 parts by weight of rubber, but lesser or larger amounts, for example from 1 to 7 or 8 parts on the same basis, may be employed. A preferred range is from 2.5 to 6 parts per 100 parts by weight of rubber.

Additional examples of vulcanization accelerators which can be used in the rubber compositions described herein are the thiazole-based accelerators, for example 2-mercaptobenzothiazole, bis(2-benzothiazolyl)disulphide, 2(2',4'-dinitrophenyl-thio) benzothiazole, benzothiazole-2-sulphenamides for instance N-isopropylbenzothiazole-2-sulphenamide, N-tert-butyl-benzothiazole-2-sulphenamide, N-cyclohexylbenzo-thiazole-2-sulphenamide, and 2(morpholinothio)benzothiazole, and thiocarbamylsulphenamides, for example N,N-dimethyl-N', N'-dicyclohexylthiocarbamoyl-sulphenamide and N(morpholinothiocarbonylthio)-morpholine. A single accelerator or a mixture of accelerators may be used. In the compositions described herein, these vulcanization accelerators are usually used in amounts of from 0.3 to 2, for example from 0.3 to 1.5, preferably from 0.4 to 1.0 and more preferably from 0.5 to 0.8, parts by weight per 100 parts by weight of rubber.

The adhesion promoters described herein are very effective in promoting bonding between rubber and brass, for example the bonding between rubber and brass-coated steel. The brass typically has a copper content of from 60 to 70% by weight, more especially from 63 to 68% by weight, with the optimum percentage depending on the particular conditions under which the bond is formed. The brass coating on brass-coated steel can have a thickness of, for example, from 0.05 to 1 micrometer, preferably from 0.07 to 0.7 micrometer, for example from 0.15 to 0.4 micrometer.

The long chain ester additive/resin combinations (i.e., adhesion promoter systems) described herein are particularly useful to adhere rubber to steel cord, where conventional adhesive pretreatment has been largely ineffective. Rubber can also be bonded effectively to alloys of cooper and zinc containing small amounts of one or more other metals, for example cobalt, nickel or iron.

For bonding rubber to zinc, as for example in bonding rubber to zinc-coated steel cords (which are widely used in the manufacture of conveyor belting) cobalt compounds have been used as adhesion promoters. Examples of such compounds are cobalt naphthenate and the cobalt-boron complexes described in GB 2 022 089 A.

Vulcanization of the rubber composition described herein is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the rubber composition at a temperature ranging from 100° C. to 200° C., the rubber composition can be used for various purposes. For example, the vulcanized rubber composition may be in the form of a tire, belt, hose, motor mounts, gaskets and air springs. In the case of a tire, it can be used for various tire components. Such tires can be built, shaped, molded and cured by various methods which are known and will be readily apparent to those having skill in such art. When the rubber composition is used in a tire, its use may be in a wire coat, bead coat, tread, apex, sidewall and combination thereof. As can be appreciated, the tire may be a passenger tire, aircraft tire, truck tire, and the like. Preferably, the tire is a passenger tire. The tire may also be a radial or bias, with a radial tire being preferred.

The invention may be better understood by reference to the following examples in which parts and percentages are by weight unless otherwise indicated.

In Part I of this project, compounds were mixed into existing EPDM recipes and tested for adhesion. The following varieties were tested:

| Variable | Example 1 | Example 2 | Example 3 | Example 4 | Example 5 |
|---|---|---|---|---|---|
| | Cyrez ® CRA-133M | Cyrez ® CRA-148M | Control-Current EPDM Formula | Cyrez ® CRA-133M/ RX-13804 | Cyrez ® CRA-148M/ RX-13804 |

Cyrez ® CRA-133M - Melamine-formaldehyde resin with 27% calcium silicate
Cyrez ® CRA-148M - Melamine-formaldehyde resin with 27% calcium silicate
RX-13804 = Di-2-ethylhexyl dimerate (EMPOL 1016 dimer acid esterified with 2-ethylhexyl alcohol, containing predominantly $C_{36}$ dimer acids and $C_{54}$ trimer acids, containing both saturated and unsaturated long chain ($C_6$–$C_{18}$) radicals with 0, 1, 2, and/or 3 carbon-to-carbon double bonds.

The melamine-formaldehyde resins are known as adhesion promoters in the tire industry. The need for rubber-to-cord adhesion generally requires the presence of a methylene donor/methylene acceptor resin system, as described above. The typical system consists of hexakismethoxymethylmelamine (HMMM) as the donor and a Novolak resin (such as resorcinol) as the acceptor.

Results

The table below shows adhesion results with polyester cord in Examples 1–5.

| Compound Variable | Adhesion-lbs-force | |
|---|---|---|
| | Room Temperature | 257° C. |
| Example 1: (Cyrez ® CRA-133M) | 23.48 | 2.91 |
| Example 2: (Cyrez ® CRA-148M) | 21.57 | 3.58 |
| Example 3: (Control) | 22.21 | 4.88 |
| Example 4: (Cyrez ® CRA-133M/ RX-13804) | 48.76 | 10.21 |
| Example 5: (Cyrez ® CRA-148M/ RX-13804) | 47.70 | 14.21 |

The control (Example 3) was EPDM with the polyester cord pretreated with a melamine formaldehyde resin and an adhesive from Lord Corporation (Cary, N.C.). The polyester cord used in Examples 1, 2, 4, and 5 were treated with melamine formaldehyde resin but not with an adhesive. Examples 1 and 2 contain just the melamine resin and provide basically equal adhesion to the control compound, which is significant since the cords used were not coated with adhesive. Examples 4 and 5 contain a combination of resin and the esters described herein, and show an unexpected increase in adhesion. The adhesive forces for Examples 4 and 5 are increased at least 100% compared to the control and resin only Examples (1–3).

These results indicate that the resin/ester combination provides a dramatic increase in adhesive force between EPDM and polyester cord compared to the control compound and the compounds containing only resin.

The formulation and data collected for Examples 1–5 are shown in Table I:

TABLE I

| | Example 1 | Example 2 | Example 3 | Example 4 | Example 5 |
|---|---|---|---|---|---|
| Nordel P3720 (EPDM) | 100.00 | → | → | → | → |
| N762 Carbon Black | 56.00 | → | → | → | → |
| Kadox 930 Zinc Oxide | 5.00 | → | → | → | → |
| Ricon 150 | 5.00 | → | → | → | → |
| SR350 | 4.00 | → | → | → | → |
| Cyrez ® CRA-133M | 7.00 | — | — | 7.00 | — |
| Cyrez ® CRA-148M | — | 7.00 | — | — | 7.00 |
| RX-13804 | — | — | — | 10.00 | 10.00 |
| Subtotal | 177.00 | 177.00 | 170.00 | 187.00 | 187.00 |
| MILL ADDITION | | | | | |
| Vulcup 40KE | 7.00 | → | → | → | → |
| Total | 184.00 | 184.00 | 177.00 | 194.00 | 194.00 |

| Major Variable | Cyrez ® CRA-133M Example 1 | Cyrez ® CRA-148M Example 2 | Control Example 3 | Cyrez ® CRA-133M/ RX-13804 Example 4 | Cyrez ® CRA-148M/ RX-13804 Example 5 |
|---|---|---|---|---|---|
| Viscosity and Curing Properties | | | | | |
| Mooney Viscosity at 212° F. | | | | | |
| Minimum Viscosity | 41.3 | 41.9 | 41.8 | 30.3 | 33.9 |
| t5, minutes | | | | 56.8 | |
| Mooney Viscosity at 250° F. | | | | | |
| Minimum Viscosity | 31 | 32.7 | 34.9 | 25.9 | 28.5 |
| t5, minutes | 10.8 | 11.1 | 9.7 | 8.3 | 8.3 |
| t10, minutes | 11.8 | 12.8 | 11.3 | 9.3 | 9 |
| t35, minutes | 13.8 | 18.3 | 17 | | 11.8 |
| Oscillating Disc Rheometer at 350° F. | | | | | |
| $M_L$ | 19 | 9 | 8.3 | 6.3 | 8.8 |
| $M_H$ | 151.9 | 159.3 | 156.6 | 57.8 | 62.9 |
| $t_s2$, minutes | 0.92 | 0.92 | 0.83 | 0.92 | 1.2 |
| t'c(90), minutes | 7.5 | 7.2 | 7.9 | 5.7 | 6.3 |
| 1.25 * t'c(90), minutes | 9.4 | 9 | 9.9 | 7.1 | 7.8 |
| Cure Rate Index | 15.2 | 16 | 14.1 | 21.1 | 19.7 |
| Note: Cpds 4 & 5 Stuck To Rheometer & Press Mold | | | | | |

TABLE I-continued

Original Physical Properties

| | | | | | |
|---|---|---|---|---|---|
| Stress @ 100% Elongation, MPa | 13.1 | 14.1 | 15.2 | 4.7 | 4.9 |
| psi | 1905 | 2050 | 2200 | 680 | 705 |
| Stress @ 200% Elongation, MPa | | | | 9.9 | 9.5 |
| Stress @ 300% Elongation, MPa | | | | | |
| Tensile Ultimate, MPa | 19.0 | 18.1 | 18.7 | 12.5 | 10.9 |
| psi | 2760 | 2625 | 2705 | 1815 | 1580 |
| Elongation @ Break, % | 135 | 120 | 115 | 250 | 235 |
| Hardness Duro A, pts. | 83 | 83 | 80 | 78 | 75 |
| Specific Gravity | 1.1043 | 1.1085 | 1.1061 | 1.1075 | 1.1081 |

Adhesion Promoter

Part II

Based on Part I results which show improved adhesion of EPDM rubber to polyester cord, the resin/ester combination was evaluated in a standard natural rubber compound used for metal cord adhesion.

The compounds tested in this study were varied in ester content, with resin content kept constant. The following Table II lists the adhesion results for original, air oven aging, and humidity aging, in Examples 6–12, with parts by weight of resin and ester set forth in parentheses.

TABLE II

| Recipe Variable | Standard Resorcinol (3.85)/melamine formaldehyde (4.23) Example 6 | Cyrez ® CRA-148M Example 7 | Cyrez ® CRA-148M(8)/SM RX-13804(8) Example 8 | Cyrez ® CRA-148M(8)/SM RX-13804(6) Example 9 | Cyrez ® CRA-148M(8)/SM RX-13804(4) Example 10 | Cyrez ® CRA-148M(8)/SM RX-13840(2) Example 11 | Cyrez ® CRA-148 M(8)/SM RX-13804(6)/ Sulfur(8.4)/Vulkacit (0.75) Example 12 |
|---|---|---|---|---|---|---|---|
| Adhesion to Steel Cord Original Properties: Max. Force, lbs. (avg.) | | | | | | | |
| Average | 176.2 | 156 | 162.7 | 162.6 | 138.6 | 167.4 | 162 |
| Coverage, % | 100 | 95 | 100 | 100 | 100 | 99 | 100 |
| Air Oven Aging: 48 hrs. @ 121° C. (250° F.) Max. Force, lbs. (avg.) | | | | | | | |
| Average | 105.6 | 73.5 | 68.9 | 70.8 | 77.6 | 87.7 | 123 |
| Coverage, % | 99 | 93 | 97 | 97 | 99 | 95 | 95 |
| Force Change, % | −40 | −53 | −58 | −57 | −44 | −48 | −24 |
| Adhesion to Steel Cord Humidity Aging: 7 Days @ 94° C. (200° F.) Max. Force, lbs. (avg.) | | | | | | | |
| Average | 152.3 | 119.7 | 130.4 | 160.3 | 137.7 | 136.9 | 152.7 |
| Coverage, % | 100 | 98 | 100 | 100 | 100 | 100 | 99 |
| Force Change, % | −14 | −23 | −20 | −1.4 | −0.65 | −18 | −5.7 |
| Humidity Aging: 14 Days @ 94° C. (200° F.) Max. Force, lbs. (avg.) | | | | | | | |
| Average | 123.7 | 94.9 | 130.2 | 115.3 | 116.8 | 125.3 | 148.6 |
| Coverage, % | 88 | 75 | 93 | 90 | 90 | 90 | 95 |
| Force Change, % | −30 | −39 | −20 | −29 | −16 | −25 | −8.3 |
| Humidity Aging: 21 Days @ 94° C. (200° F.) Max. Force, | | | | | | | |

TABLE II-continued

| Recipe Variable | Standard Resorcinol (3.85)/melamine formaldehyde (4.23) Example 6 | Cyrez ® CRA-148M Example 7 | Cyrez ® CRA-148M(8)/SM RX-13804(8) Example 8 | Cyrez ® CRA-148M(8)/SM RX-13804(6) Example 9 | Cyrez ® CRA-148M(8)/SM RX-13804(4) Example 10 | Cyrez ® CRA-148M(8)/SM RX-13840(2) Example 11 | Cyrez ® CRA-148 M(8)/SM RX-13804(6)/ Sulfur(8.4)/Vulkacit (0.75) Example 12 |
|---|---|---|---|---|---|---|---|
| lbs. (avg.) | | | | | | | |
| Average | 101.4 | 64.4 | 82.6 | 107.9 | 90.3 | 108.1 | 127.3 |
| Coverage, % | 87 | 75 | 70 | 77 | 83 | 83 | 93 |
| Force Change, % | −43 | −59 | −49 | −34 | −35 | −35 | −21 |

The original wire cord adhesion results show the standard formulation to have slightly higher adhesion than formulations containing resin/ester combinations. The formulations containing resin/ester combinations are all very similar except for the resin/ester combination of 8/4. At this time, the reason why this formulation has poorer original adhesion is not known.

The humidity aging results are interesting in that Examples 9, 11 and 12 have the highest force levels and lowest percent change from the original. Example 12 has a 50% increase in curing agent amount to offset the addition of ester to the compound. This formulation had the highest force recorded and the least change from the original adhesion. This suggests that an increase in the amount of curing agent can, along with the resin/ester combination, improve aged adhesion. All the resin/ester compounds except for Example 8 (resin 8/ester 8) exhibited lower changes in recorded force than the standard compound.

The formulation for Examples 6–12 are shown in Table III.

TABLE III

| | Example 6 | Example 7 | Example 8 | Example 9 | Example 10 | Example 11 | Example 12 |
|---|---|---|---|---|---|---|---|
| SMR-L | 100.00 | → | | | | | |
| N326 | 60.00 | → | | | | | |
| Kadox 930 | 10.00 | → | | | | | |
| Cobalt Naphthenate | 2.00 | → | | | | | |
| Stearic Acid | 1.20 | → | | | | | |
| Santoflex 13 | 1.00 | → | | | | | |
| PVI | 0.20 | → | | | | | |
| Pennacolite (3.85)/ Resimene (4.23) | 8.08 | — | — | — | — | — | — |
| Cyrez ® CRA-148M | — | 8.08 | 8.00 | 8.00 | 8.00 | 8.00 | 8.00 |
| SM RX-13 804 | — | — | 8.00 | 6.00 | 4.00 | 2.00 | 6.00 |
| Subtotal | 182.48 | 182.48 | 190.40 | 188.40 | 186.40 | 184.40 | 188.40 |
| Mill Addition | | | | | | | |
| Sulfur | 5.60 | → | | | | | 8.40 |
| Vulkacit DZ | 0.50 | → | | | | | 0.75 |
| Total | 188.58 | 188.58 | 196.50 | 194.50 | 192.50 | 190.50 | 197.55 |

| Major Variable | Pennacolite (3.85)/ Resimene (4.23) Example 6 | Cyrez ® CRA-148M Example 7 | Cyrez ® CRA-148M(8)/SM RX-13804(8) Example 8 | Cyrez ® CRA-148M(8)/SM RX-13804(6) Example 9 | Cyrez ® CRA-148M(8)/SM RX-13804(4) Example 10 | Cyrez ® CRA-148M(8)/SM RX-13804(2) Example 11 | Cyrez ® CRA-148 M(8)/SM RX-13804(6)/ Sulfur(8.4)/Vulkacit (0.75) Example 12 |
|---|---|---|---|---|---|---|---|
| Viscosity and Curing Properties Mooney Viscosity @ 168° C. (335° F.) | | | | | | | |
| Min. Viscosity | 70.2 | 67.9 | 57.9 | 59.7 | 62.1 | 63.7 | 48.1 |
| t5, minutes | 1.4 | 1.8 | 1.9 | 1.8 | 2.2 | 2 | 1.7 |
| t10, minutes | 1.8 | 2 | 2.2 | 2.2 | 2.5 | 2.3 | 2 |
| t35, minutes | 2.9 | 2.6 | 2.8 | 2.8 | 3.3 | 2.9 | 2.6 |
| Oscillating Disc Rheometer at 168° C. (335° F.) | | | | | | | |
| $M_L$ | 16.6 | 16.9 | 14.1 | 14.8 | 15.7 | 15.8 | 16 |
| $M_H$ | 47.5 | 26.6 | 23.6 | 24.6 | 22.2 | 38.8 | 73.6 |
| $t_s2$, minutes | 1.4 | 1.8 | 1.8 | 1.8 | 1.8 | 1.8 | 1.6 |
| t'c(90), minutes | 5.3 | 4.5 | 4.7 | 4.7 | 4.4 | 4.9 | 5.3 |
| 1.25 * t'c(90), | 6.7 | 5.6 | 5.8 | 5.8 | 5.5 | 6.2 | 6.7 |

TABLE III-continued

| | | | | | | | |
|---|---|---|---|---|---|---|---|
| minutes | | | | | | | |
| Cure Rate Index | 25.6 | 36.4 | 35.2 | 35.2 | 37.5 | 31.6 | 26.7 |
| Original Physical Properties | | | | | | | |
| Stress @ 100% Elongation, MPa | 7.0 | 5.9 | 3.9 | 5.1 | 5.0 | 5.8 | 7.6 |
| psi | 1010 | 855 | 565 | 740 | 730 | 845 | 1105 |
| Stress @ 200% Elongation, MPa | 14.8 | 12.4 | 8.8 | 10.9 | 10.8 | 12.1 | 14.8 |
| Stress @ 300% Elongation, MPa | — | 19.2 | 14.8 | 17.1 | 16.9 | 18.6 | — |
| Tensile Ultimate, MPa | 20.4 | 20.9 | 21.5 | 20.6 | 21.2 | 20.7 | 20.1 |
| psi | 2960 | 3025 | 3116 | 2990 | 3080 | 3010 | 2915 |
| Elongation @ Break, % | 275 | 330 | 415 | 370 | 380 | 335 | 285 |
| Hardness Duro A, pts. | 79 | 78 | 72 | 75 | 76 | 77 | 79 |
| Specific Gravity | AVERAGE | 1.204 | AVERAGE | AVERAGE | AVERAGE | — | 1.203 |

The use of the resin/ester combination in a sulfur-cured natural rubber formulation can improve wire cord adhesion after heat aging and humidity aging as compared to a standard natural rubber formulation.

In order to verify that the increased cure system of Example 12 was not solely responsible for the increased adhesion performance of Example 12, an additional formulation, Example 13, was tested. The only difference between Examples 6 and 13 is that Example 13 has a 50% increase in the amount of cure system additives (Sulfur and Vulkacit). Table IV provides comparative data which demonstrates that increasing the cure system of the "control compound" (i.e., the prior art formulation of Example 6) by 50% does not lead to an increased adhesive effect. Accordingly, these data confirm that the increase in adhesion observed in Example 12 cannot solely be attributed to the increased amount of cure system additives, i.e., the increased adhesion is due to the adhesion promoter.

TABLE IV

| | Recipe Variable | | |
|---|---|---|---|
| | Pennacolite(3.85)/ Resimene(4.23)/ Sulfur(8.4)/ Vulkacit(0.75) Example 13 | Pennacolite (3.85)/ Resimene (4.23) "Control" Example 6 | Cyrez ® CRA-148M(8)/ SM RX-13804(6)/ Sulfur(8.4)/ Vulkacit(0.75) Example 12 |
| SMR-L | 100 | → | → |
| N 326 | 60 | → | → |
| Kadox 930 | 10 | → | → |
| Cobalt Napthenate | 2 | → | → |
| Stearic Acid | 1.20 | → | → |
| Santoflex 13 | 1.00 | → | → |
| PVI | 0.20 | → | → |
| Pennacolite (3.85)/Resimene(4.23) | 8.08 | 8.08 | — |
| Cyrez ® CRA-148M | — | — | 8.00 |
| SM RX-13804 | — | — | 6.00 |
| Subtotal | 182.48 | 182.48 | 188.40 |
| Mill Addition | | | |
| Sulfur | 8.40 | 5.60 | 8.40 |
| Vulkacit | 0.75 | 0.50 | 0.75 |
| Total | 191.63 | 188.58 | 197.55 |
| | Major Variable | | |
| Processing Properties | Pennacolite(3.85)/ Resimene(4.23)/ Sulfur(8.4)/ Vulkacit(0.75) Example 13 | Pennacolite (3.85)/ Resimene(4.23) "Control" Example 6 | Cyrez ® CRA-148M(8)/ SM RX-13804(6)/ Sulfur(8.4)/ Vulkacit(0.75) Example 12 |
| Viscosity and Curing Properties | | | |
| Mooney Viscosity at 168° C. (335° F.) | | | |
| Minimum Viscosity | 69.3 | 77.2 | 66.4 |
| t5, minutes | 1.3 | 1.2 | 1.3 |
| t10, minutes | 1.6 | 1.3 | 1.6 |
| t35, minutes | 2.3 | 1.9 | 2.2 |
| Oscillating Disc Rheometer at 168° C. (335° F.) | | | |
| $M_L$ | 17 | 20 | 17.3 |
| $M_H$ | 100.5 | 101.1 | 88.4 |
| $t_s2$, minutes | 1.4 | 1.5 | 1.7 |
| t'c(90), minutes | 6.7 | 9.6 | 5.9 |
| 1.25 * t'c(90), mins. | 8.3 | 12 | 7.4 |
| Cure Rate Index | 19.1 | 12.4 | 23.5 |
| Vulcanizate Properties | | | |
| Original Physical Properties | | | |
| Stress @ 100% Elongation, MPa | 8.1 | 6.5 | 5.9 |
| psi | 1170 | 945 | 850 |
| Stress @ 200% Elongation, MPa | 15.7 | 13.7 | 11.5 |
| Stress @ 300% Elongation, MPa | — | — | 16.9 |

TABLE IV-continued

| | | | |
|---|---|---|---|
| Tensile Ultimate, MPa | 18.4 | 20.1 | 18.7 |
| psi | 2665 | 2920 | 2710 |
| Elongation @ Break, % | 240 | 300 | 330 |
| Hardness Duro A, pts. | 82 | 80 | 80 |
| Specific Gravity | 1.201 | 1.199 | 1.204 |
| Adhesion to Steel Cord Original Properties: | | | |
| Maximum Force, lbs. (avg). | | | |
| Set 1 | 90.1 | 104.4 | 80.3 |
| Set 2 | 78.4 | 99.3 | 80.6 |
| Set 3 | 82.4 | 101.1 | 103.3 |
| Average | 83.6 | 101.6 | 88.1 |
| Coverage, % | 90 | 90 | 90 |

Adhesion Promoter

Part III

Next, natural rubber-to-metal bonding was evaluated to determine the effect of added ester(s), as described herein. This presents a large potential for automotive parts, such as motor mounts, brakes, hoses, and the like.

The first study focused on long chain esters in natural rubber and their effect on adhesion to metal (see Table V—Examples 14–17). The data indicate that the adhesion promoters described herein improve adhesion to brass in a sulfur-cured rubber formulation. The use of the resin/ester combination did not improve adhesion versus compounds with ester only.

TABLE V

| | Example 14 | Example 15 | Example 16 | Example 17 |
|---|---|---|---|---|
| SMR-L | 100.00 | → | | |
| Kadox 930 | 5.00 | → | | |
| Stearic Acid | 2.00 | → | | |
| N 330 | 35.00 | → | | |
| Cyrez ® CRA-148M | 6.95 | — | 6.95 | — |
| RX-13804 | 6.95 | 5.00 | 6.95 | — |
| Subtotal | 155.90 | 147.00 | 155.90 | 142.00 |
| Mill Addition | | | | |
| Sulfur | 2.25 | — | — | — |
| Santocure TBSI | 0.70 | — | — | — |
| DiCup 40KE | — | 5.00 | →  | |
| Total | 158.85 | 152.00 | 160.90 | 147.00 |
| Major Variable | | | | |
| | RX-13804/ Cyrez ® CRA-148M Example 14 | RX-13804 Example 15 | RX-13804/ Cyrez ® CRA-148M Example 16 | Control Example 17 |
| Viscosity and Curing Properties Mooney Viscosity at 335° F. (168° C.) | | | | |
| Minimum Viscosity | 47.5 | 46.5 | 62 | 56 |
| t5, minutes | 2 | 1.1 | 0.75 | 0.85 |
| t10, minutes | 2.3 | 1.3 | 0.85 | 1 |
| t35, minutes | 3 | 1.7 | 1.1 | 1.8 |
| Oscillating Disc Rheometer at 335° F. (168° C.) | | | | |
| $M_L$ | 13.4 | 12.4 | 11.4 | 13.1 |
| $M_H$ | 41.9 | 67 | 74.2 | 74.6 |
| $t_s2$, minutes | 1.8 | 1.3 | 1.2 | 1.1 |
| t'c(90), minutes | 7.2 | 13.6 | 15.3 | 14.5 |
| 1.25 * t'c(90), minutes | 9 | 17 | 19.1 | 18.1 |
| Cure Rate Index | 18.7 | 8.1 | 7.1 | 7.5 |
| Original Physical Properties | | | | |
| Stress @ 100% Elongation, MPa | 2.0 | 4.0 | 5.5 | 5.1 |
| psi | 290 | 575 | 800 | 735 |
| Stress @ 200% Elongation, MPa | 5.6 | 14.7 | — | — |
| Stress @ 300% Elongation, MPa | 10.6 | — | — | — |
| Tensile Ultimate, MPa | 16.5 | 16.4 | 9.9 | 16.2 |
| psi | 2390 | 2385 | 1440 | 2355 |
| Elongation @ Break, % | 440 | 215 | 140 | 190 |
| Hardness Duro A, pts. | 52 | 57 | 62 | 61 |
| Specific Gravity | 1.097 | 1.082 | 1.105 | 1.090 |
| Metal Adhesion- ASTM D429 Brass | Sulfur | Peroxide | Peroxide | Peroxide |
| Adhesion Force, lbf/in. width | 82.58 | 1.69 | — | — |
| Failure Type | R | R | R | R |
| % Failure Aluminum | 100 | 100 | 100 | 100 |
| Adhesion Force, lbf/in. width | — | — | — | — |
| Failure Type | R | R | R | R |
| % Failure Steel | 100 | 100 | 100 | 100 |
| Adhesion Force, lbf/in. width | — | — | — | — |
| Failure Type | R | R | R | R |
| % Failure | 100 | 100 | 100 | 100 |

R = rubber failure,
RC = rubber-cement failure,
CP = cement-primer failure,
M = primer-metal failure
Compounds 2, 3 and 4 bloomed.

Table VI provides data wherein a sulfur cure system was used in formulations containing resin only (Example 18), a resin combined with a long chain ester of the disclosure (Example 20), and a control containing no resin and no ester (Example 19). From these data, it can be seen that the adhesion promoter system including a long chain ester and an adhesive resin performs best, and gives superior adhesive results when compared with the control formulation and the formulation containing the resin, but not including an ester of the disclosure.

TABLE VI

| | Recipe Variable | | |
|---|---|---|---|
| | Cyrez ® CRA Resin 148M Example 18 | "Control" Example 19 | Cyrez ® CRA Resin 148M/RX-13804 Example 20 |
| SMR-L | 100 | → | |
| Kadox 930 | 5.00 | → | |
| Stearic Acid | 2.00 | → | |
| N 330 | 35.00 | → | |
| Cyrez ® Resin 148-M | 7.00 | — | 7.00 |
| RX-13804 | — | — | 7.00 |
| Subtotal | 149.00 | 142.00 | 156.00 |
| Mill Addition | | | |
| Sulfur | 2.25 | 2.25 | 2.25 |
| Santocure TBSI | 0.70 | 0.70 | 0.70 |
| Total | 151.95 | 144.95 | 158.95 |
| Viscosity and Curing Properties Mooney Viscosity at 168° C. (335° F.) | | | |
| Minimum Viscosity | 48.1 | 53.2 | 48.2 |
| t5, minutes | 2.1 | 1.5 | 2 |
| t10, minutes | 2.4 | 1.8 | 2.3 |
| t35, minutes | 3.2 | 2.6 | 2.9 |
| Oscillating Disc Rheometer at 168° C. (335° F.) | | | |
| $M_L$ | 13.7 | 14.6 | 13.5 |
| $M_H$ | 31.2 | 36 | 40.9 |
| $t_s2$, minutes | 1.8 | 1.7 | 1.8 |
| t'c(90), minutes | 5.3 | 5.3 | 7.1 |
| 1.25 * t'c(90), mins. | 6.7 | 6.7 | 9 |
| Cure Rate Index | 28.6 | 27.3 | 19 |
| Vulcanizate Properties Original Physical Properties | | | |
| Stress @ 100% Elongation, MPa | 1.9 | 1.8 | 2.0 |
| psi | 280 | 255 | 300 |
| Stress @ 200% Elongation, MPa | 4.7 | 4.5 | 5.6 |
| Stress @ 300% Elongation, MPa | 8.6 | 8.8 | 10.6 |
| Tensile Ultimate, MPa | 22.1 | 24.5 | 16.5 |
| psi | 3205 | 3560 | 2380 |
| Elongation @ Break, % | 555 | 565 | 440 |
| Hardness Duro A, pts. | 57 | 55 | 52 |
| Specific Gravity | — | — | 1.097 |

TABLE VI-continued

| Metal Adhesion - ASTM D249 | | | |
|---|---|---|---|
| Brass | | | |
| Adhesion Force, lbf/in. width | 118.2 | 46.3 | 138.9 |
| Failure Type | R, RM | R | R, RM |
| % Failure Type | 95, 5 | 100 | 95, 5 |
| Aluminum | | | |
| Adhesion Force, lbf/in. width | Fail | Fail | Fail |
| Failure Type | RM | RM | RM |
| % Failure | 100 | 100 | 100 |
| Steel | | | |
| Adhesion Force, lbf/in. width | Fail | Fail | Fail |
| Failure Type | RM | RM | RM |
| % Failure | 100 | 100 | 100 |

R = rubber failure,
RC = rubber-cement failure,
CP = cement-primer failure,
M = primer-metal failure,
RM = rubber metal failure Next, the effect of the long chain esters described herein was evaluated in an EPDM rubber formulation for rubber to metal bonding. The cure system was also evaluated to determine the effect of peroxide versus a sulfur system. The sulfur formulations did not work, thus these formulations were discarded. The peroxide cured formulations were varied by using the ester alone and the resin/ester combination. The data below in Table VII (Examples 21–23), lists adhesion results for brass, aluminum and steel cord in EPDM.

TABLE VII

| Major Variable | RX-13804 Example 21 | RX-13804/Cyrez ® CRA-148M Example 22 | Control Example 23 |
|---|---|---|---|
| Brass | | | |
| Adhesion Force, lbf/in. width | 1.26 | 52.43 | — |
| Failure Type | R | R | R |
| % Failure | 100 | 100 | 100 |
| Aluminum | | | |
| Adhesion Force, lbf/in. width | — | — | — |
| Failure Type | R | R | R |
| % Failure | 100 | 100 | 100 |
| Steel | | | |
| Adhesion Force, lbf/in. width | 16.82 | 19.97 | — |
| Failure Type | R | R | R |
| % Failure | 100 | 100 | 100 |

R = rubber failure,
RC = rubber-cement failure,
CP = cement-primer failure,
M = primer-metal failure The formulation containing the resin/ester has significantly greater adhesion to brass than the formulation with just ester, and the control. The steel adhesion results show that the formulation with ester does provide some adhesion, but the resin/ester combination is unexpectedly better. The control formulation has no adhesion to steel. None of the formulations has adhesion to aluminum.

The recipe/formulation data for Examples 21–23 is shown in Table VIII:

TABLE VIII

|  | Example 21 | Example 22 | Example 23 |
|---|---|---|---|
| Nordel IP 3720 | 100 | → | → |
| N 762 | 56 | → | → |
| Kadox 930 | 5.00 | → | → |
| Ricon 150 | 5.00 | → | → |
| SR 350 | 4.00 | → | → |
| RX-13804 | 10.00 | 7.00 | — |
| Cyrez ® Resin 148M | — | 10.00 | — |
| Subtotal Mill Addition | 180.00 | 187.00 | 170.00 |
| VulCup 40KE | 7.00 | → | → |
| Total | 187.00 | 194.00 | 177.00 |

| | Major Variable | | |
|---|---|---|---|
| | RX-13804 Example 21 | RX-13804/ Cyrez ® CRA-148M Example 22 Peroxide Cure | Control Example 23 |
| Viscosity and Curing Properties Mooney Viscosity at 168° C. (335° F.) | | | |
| Minimum Viscosity | 23.9 | 29.6 | 33.6 |
| t5, minutes | 9.5 | 11.2 | 7.5 |
| t10, minutes | 10.7 | 11.9 | 7.9 |
| t35, minutes | — | 15.8 | 8.8 |
| Oscillating Disc Rheometer at 168° C. (335° F.) | | | |
| $M_L$ | 6.6 | 12.2 | 9.2 |
| $M_H$ | 87.1 | 92.4 | 177 |
| $t_s2$, minutes | 0.92 | 0.92 | 0.83 |
| t'c(90), minutes | 6.5 | 8.4 | 8.5 |
| 1.25 * t'c(90), minutes | 8.1 | 10.5 | 10.6 |
| Cure Rate Index | 17.9 | 13.3 | 13 |
| Original Physical Properties | | | |
| Stress @ 100% Elongation, MPa | 1.4 | 6.5 | 13.7 |
| psi | 198 | 940 | 1990 |
| Stress @ 200% Elongation, MPa | 11.2 | 12 | — |
| Stress @ 300% Elongation, MPa | — | — | — |
| Tensile Ultimate, MPa | 12.2 | 13.0 | 19.7 |
| psi | 1770 | 1890 | 2860 |
| Elongation @ Break, % | 200 | 210 | 135 |
| Hardness Duro A, pts. | 80 | 83 | 86 |
| Specific Gravity | 1.099887 | 1.122098 | 1.114178 |

Table IX provides comparative data that supplements the data presented in Table VIII. Example 24, contains resin, but does not contain any of the long chain esters disclosed herein. As can be seen from the data of Table IX, Example 24 did not promote adhesion between EPDM and metal substrates.

Table IX also contains formulations wherein the ester was varied. A saturated ester, UBS 020602, in accordance with the disclosure, was used to formulate Examples 25 and 26. In Example 25, the saturated ester additive was not combined with an adhesive resin as described herein, and failed to promote adhesion between EPDM and the metal substrates. However, in Example 26, the saturated ester was combined with an adhesive resin, and excellent adhesion between metal substrates and EPDM, more particularly between steel and EPDM, was obtained.

TABLE IX

| Recipe Variable | RX-13804/Cyrez ® CRA-148M Example 22 | Cyrez ® CRA-148M Example 24 | UBS 020602 Example 25 | UBS 020692/ Cyrez ® CRA-148M Example 26 | Control Example 23 |
|---|---|---|---|---|---|
| Nordel IP 3720 | 100.00 | → | → | → | → |
| N762 | 56.00 | → | → | → | → |
| Kadox 930 | 5.00 | → | → | → | → |
| Ricon 150 | 5.00 | → | → | → | → |
| SR 350 | 4.00 | → | → | → | → |
| RX 13804 | 7.00 | — | — | — | — |
| Cyrez ® Resin 148M | 10.00 | 10.00 | — | 10.00 | — |
| UBS 020602 | — | — | 7.00 | 7.00 | — |
| Subtotal Mill Addition | 187.00 | 180.00 | 177.00 | 187.00 | 170.00 |
| Vulcup 40 KE | 7.00 | → | → | → | → |
| Total | 194.00 | 187.00 | 184.00 | 194.00 | 177.00 |

| Recipe Variable Processing Properties | RX-13804/148M Example 22 | Cyrez ® CRA-148M Example 24 | UBS 020602 Example 25 | UBS 020602 Cyrez ® CRA-148M Example 26 | Control Example 23 |
|---|---|---|---|---|---|
| Viscosity and Curing Properties | | | | | |

TABLE IX-continued

| Mooney Viscosity at 121° C. (250° F.) | | | | | |
|---|---|---|---|---|---|
| Minimum Viscosity | 26.3 | 32.6 | 23.4 | 26.6 | 28.7 |
| t5, minutes | 12.8 | 9.8 | 11.4 | 11.1 | 9.7 |
| t10, minutes | 14.2 | 10.4 | 12.3 | 11.8 | 10.2 |
| t35, minutes | FAIL | 12.7 | 17.8 | 14.8 | 11.4 |
| Oscillating Disc Rheometer at 177° C. (350° F.) | | | | | |
| $M_L$ | 6.7 | 10.8 | 6.7 | 8 | 8.8 |
| $M_H$ | 74.1 | 115.9 | 129 | 87.4 | 171.6 |
| $t_s2$, minutes | 0.92 | 0.92 | 1.1 | 1 | 1 |
| t'c(90), minutes | 7.4 | 10.1 | 9.1 | 9.3 | 10.3 |
| 1.25 * c(90), minutes | 9.3 | 12.6 | 11.4 | 11.6 | 12.9 |
| Cure Rate Index | 15.4 | 10.9 | 12.5 | 12.1 | 10.7 |
| Vulcanizate Properties Original Physical Properties | | | | | |
| Stress @ 100% Elongation, MPa | 6.1 | 9.3 | 8.4 | 6.3 | 13.4 |
| psi | 890 | 1350 | 1220 | 920 | 1945 |
| Stress @ 200% Elongation, MPa | 11.7 | — | — | — | — |
| Stress @ 300% Elongation, MPa | — | — | — | — | — |
| Tensile Ultimate, MPa | 12.3 | 15.2 | 14.1 | 12.0 | 18.2 |
| psi | 1785 | 2200 | 2045 | 1735 | 2635 |
| Elongation @ Break, % | 205 | 160 | 145 | 180 | 125 |
| Hardness Duro A, pts. | 85 | 87 | 85 | 83 | 87 |
| Specific Gravity | 1.119 | 1.128 | 1.102 | 1.120 | 1.110 |
| Metal Adhesion - ASTM D429 Brass | | | | | |
| Adhesion Force, lbf/in. width | 91 | 61.5 | FAIL | 77.6 | FAIL |
| Failure Type | R | R | RM | R | RM |
| % Failure | 100 | 100 | 100 | 100 | 100 |
| Aluminum | | | | | |
| Adhesion Force, lbf/in. width | FAIL | FAIL | FAIL | FAIL | FAIL |
| Failure Type | RM | RM | RM | RM | RM |
| % Failure | 100 | 100 | 100 | 100 | 100 |
| Steel | | | | | |
| Adhesion Force, lbf/in. width | FAIL | 35.3 | FAIL | 77 | FAIL |
| Failure Type | R | RM | RM | RM-R | RM |
| % Failure | 100 | 100 | 100 | 67%, 33% | 100 |

R = rubber failure, RC = rubber-cement failure, CP = cement-primer failure, M = primer-metal failure, RM = rubber metal failure

EPDM Rubber to Metal Bonding

Additional esters were evaluated to determine their effect on adhesion when combined with an adhesive resin. The esters evaluated were as follows:

| | |
|---|---|
| Plasthall DOS | A saturated diester based on 2-ethylhexyl alcohol and sebacic acid. |
| RX-13577 | An unsaturated monoester based on tridecyl alcohol and tall oil fatty acid. |
| RX-13824 | An unsaturated dimerate ester based on tridecyl alcohol and a C-36 dimer acid. This ester is similar to RX-13804, which uses the same dimer acid, but RX-13804 is reacted with 2-ethylhexyl alcohol (di-2-ethylhexyl dimerate). |

The results indicate that the compound with DOS/resin provides good adhesion to brass and steel. The RX-13577/resin compound has excellent adhesion to brass and steel, and the force values for steel are greater than any of the other ester/resin combinations. The data suggests that a greater degree of ester unsaturation levels provides greater adhesion because RX-13577 does have more unsaturated sites by weight than RX-13804 or RX-13824. Another piece of data that helps support the above statement is the steel adhesion data for the ester only compounds. The RX-13577 compound had the only measurable adhesion while DOS and RX-13824 had no adhesion values.

The data is set forth in Table X, Examples 27–34:

TABLE X

|  | Example 27 | Example 28 | Example 29 | Example 30 | Example 31 | Example 32 | Example 33 | Example 34 |
|---|---|---|---|---|---|---|---|---|
| Nordel IP 3720 | 100.00 | → | → | → | → | → | → | → |
| N762 | 56.00 | → | → | → | → | → | → | → |
| Kadox 930 | 5.00 | → | → | → | → | → | → | → |
| Ricon 150 | 5.00 | → | → | → | → | → | → | → |
| SR 350 | 4.00 | → | → | → | → | → | → | → |
| Plasthall DOS | 10.00 | 7.0 | — | — | — | — | — | — |
| Cyrez ® CRA-148M | — | 10.00 | 7.00 | — | 10.00 | — | 10.00 | — |
| RX-13577 | — | — | — | 10.00 | 7.00 | — | — | — |
| RX-13824 | — | — | — | — | — | 10.00 | 7.00 | — |
| Control | — | — | — | — | — | — | — | — |
| Subtotal | 180.00 | 187.00 | 177.00 | 180.00 | 187.00 | 180.00 | 187.00 | 170.00 |
| Mill Addition |  |  |  |  |  |  |  |  |
| Vulcup 40KE | 7.00 | → | → | → | → | → | → | → |
| TOTAL | 187.00 | 194.00 | 184.00 | 187.00 | 194.00 | 187.00 | 194.00 | 177.00 |

| Major Variable | Plasthall DOS (dioctylsebacate) Example 27 | Plasthall DOS/Cyrez ® CRA-148M Example 28 | Cyrez ® CRA-148M Example 29 | RX-13577 Example 30 | RX-13577 Cyrez ® CRA-148M Example 31 | RX-13824 Example 32 | RX-13824 Cyrez ® CRA-148M Example 33 | Control Example 34 |
|---|---|---|---|---|---|---|---|---|
| Plasticizer Processing Properties Viscosity and Curing Properties Mooney Viscosity at 250° F. (121° C.) |  |  |  |  |  |  |  |  |
| Mi Viscosity | 19.9 | 26.1 | 32.2 | 21.1 | 26.1 | 21.3 | 26.8 | 30.9 |
| t5, minutes | 8.6 | 9.6 | 8.4 | 7.6 | 7.3 | 8.9 | 7.8 | 6.6 |
| t10, minutes | 9.3 | 11.8 | 8.9 | 8.6 | 7.9 | 9.8 | 8.3 | 6.9 |
| t35, minutes | FAIL | FAIL | 17.6 | FAIL | FAIL | FAIL | 10.2 | 8.3 |
| Oscillating Disc Rheometer at 350° F. (177° C.) |  |  |  |  |  |  |  |  |
| $M_L$ | 5.5 | 6.6 | 10 | 6.6 | 7.2 | 6.4 | 8.6 | 9.7 |
| $M_H$ | 88.6 | 63.1 | 84.9 | 58.8 | 52.8 | 75.3 | 58.5 | 125.8 |
| $t_s2$, minutes | 0.92 | 0.92 | 0.92 | 1.3 | 0.92 | 1 | 0.92 | 0.83 |
| t'c(90),mins | 6.3 | 6 | 6.1 | 6.9 | 6 | 6.1 | 5.9 | 6.3 |
| 1.25 * t'c(90), mins. | 7.8 | 7.5 | 7.6 | 8.7 | 7.5 | 7.6 | 7.4 | 7.8 |
| Cure Rate Index | 18.8 | 19.7 | 19.4 | 17.6 | 19.7 | 19.7 | 20 | 18.5 |
| Original Phys. Properties |  |  |  |  |  |  |  |  |
| Stress @ 100% Elongation, MPa | 4.8 | 5.0 | 6.4 | 3.8 | 4.5 | 4.2 | 4.7 | 8.2 |
| psi | 700 | 725 | 925 | 545 | 655 | 615 | 680 | 1195 |
| Stress @ 200% Elongation, MPa | 11.4 | 9.4 | 12.3 | 7.5 | 7.8 | 9.7 | 8.2 | — |
| Stress @ 300% Elongation, MPa | — | — | — | 11.1 | 10.4 | — | — | — |
| Tensile Ultimate, MPa | 13.5 | 11.1 | 13.9 | 12.7 | 10.4 | 11.7 | 10.4 | 18.1 |
| psi | 1960 | 1650 | 2010 | 1835 | 1515 | 1690 | 1515 | 2620 |
| Elongation @ Break, % | 220 | 250 | 225 | 320 | 300 | 235 | 275 | 175 |
| Hardness Duro A, pts. | 81 | 84 | 86 | 79 | 82 | 80 | 82 | 85 |
| Specific Gravity | 1.102 | 1.123 | 1.125 | 1.098 | 1.118 | 1.098 | 1.121 | 1.113 |

TABLE X-continued

| Metal Adhesion - ASTM D429 Brass | | | | | | | | |
|---|---|---|---|---|---|---|---|---|
| Adhesion force, lbf/in. width | — | 128.1 | 51.1 | — | 139.4 | — | 133.5 | — |
| Failure Type | RM | RM | R | RM | R | RM | R | RM |
| % Failure | 100 | 100 | 100 | 100 | 100 | 100 | 100 | 100 |
| Aluminum | | | | | | | | |
| Adhesion force, lbf/in. width | — | — | — | — | — | — | — | — |
| Failure Type | RM | RM | RM | RM | RM | RM | RM | RM |
| % Failure | 100 | 100 | 100 | 100 | 100 | 100 | 100 | 100 |
| Steel | | | | | | | | |
| Adhesion force, lbf/in. width | — | 37.3 | — | 14.2 | 96.7 | — | 42.3 | — |
| Failure Type | RM | RM | RM | RM | RM | RM | RM | RM |
| % Failure | 100 | 100 | 100 | 100 | 50 | 100 | 100 | 100 |

R = rubber failure, RC = rubber-cement, CP = cement-primer failure, M = primer-metal failure, RM = rubber metal failure

Chlorinated Polyethylene Rubber to Polyester Cord

More specifically, RX-13845 was evaluated for cord or fabric to rubber adhesion. RX-13845 is an adhesion promoter system consisting of 36 wt. % RX-13804, 36 wt. % Cyrez CRA-138 Resin (a liquid at room temperature), and 28% substrate (synthetic calcium silicate). RX-13845 was prepared by adding preheated Cyrez CRA 138 resin liquid to a dry carrier (substrate) contained in a mixing bowl, followed by addition of preheated RX-13804. The materials were mixed at low speed for 3 minutes. The materials were blended for an additional 3 minutes. RX-13845 permits liquids to be handled as powders. Because the active adhesion promoter is released, the active ingredient is released from the carrier, incorporation of RX-13845 into a rubber compound allows the adhesion promoter to function in the same manner as if it had been incorporated into rubber as a neat material.

The results demonstrate a significant improvement in adhesion of untreated nylon fibers, isocyanate treated nylons, isocyanate treated aramid fibers, and untreated polyester fibers to chlorinated polyethylene polymer. The data is set forth in Table XI, Examples 34–38.

TABLE XI

| | Example 35 | Example 36 | Example 37 | Example 38 |
|---|---|---|---|---|
| Tyrin CPE CM 0730 | 100.00 | → | | |
| N 774 Carbon Black | 55.00 | → | | |
| N 650 Carbon Black | 30.00 | → | | |
| Albacar 5970(CaCO$_3$) | 10.00 | → | | |
| PARAPLEX ® G-62 | 15.00 | → | | |
| PLASTHALL ® TOTM | 30.00 | → | | |
| Calcium Oxide | 4.40 | → | | |
| Flectol TMQ | 0.20 | → | | |
| RX-13845 | — | 3.00 | 6.00 | 10.00 |
| Subtotal | 244.60 | 247.60 | 250.60 | 254.60 |
| Mill Addition | | | | |
| Vulcup 40KE | 9.50 | → | | |
| Triganox 17/40 | 3.50 | → | | |
| PLB 5405(75%) | 6.70 | → | | |
| Total | 264.30 | 267.30 | 270.30 | 274.30 |

TABLE XI-continued

| | | Major Variable | | |
|---|---|---|---|---|
| | Control | RX-13845 (3) | RX-13845 (6) | RX-13845 (10) |
| Viscosity and Curing Properties | | | | |
| Mooney Viscosity at 132° C. (270° F.) | | | | |
| Minimum Viscosity | 40.7 | 40.4 | 38.2 | 37.0 |
| t5, minutes | 2.2 | 2.2 | 2.3 | 2.3 |
| t10, minutes | 2.5 | 2.5 | 2.5 | 2.5 |
| t35, minutes | 3.0 | 3.0 | 3.2 | 3.0 |
| Oscillating Disc Rheometer at 160° C. (320° F.) | | | | |
| $M_L$ | 9.4 | 11.9 | 10 | 9.4 |
| $M_H$ | 48.7 | 42.2 | 38.4 | 37 |
| $t_s2$, minutes | 1.3 | 1.2 | 1.7 | 1.5 |
| t'c(90), minutes | 25.8 | 28.3 | 29.7 | 21.8 |
| 1.25 * t'c(90), minutes | 32.3 | 35.4 | 37.1 | 27.3 |
| Cure Rate Index | 4.1 | 3.7 | 3.6 | 4.9 |
| Original Physical Properties | | | | |
| Stress @ 100% Elongation, MPa | 6.4 | 6.2 | 6.3 | 5.4 |
| psi | 930 | 905 | 920 | 790 |
| Stress @ 200% Elongation, MPa | 11.7 | 10.9 | 11.1 | 9.2 |
| Stress @ 300% Elongation, MPa | — | — | — | — |
| Tensile Ultimate, MPa | 13.5 | 12.5 | 12.8 | 10.5 |
| psi | 1965 | 1820 | 1850 | 1530 |
| Elongation @ Break, % | 250 | 255 | 250 | 275 |
| Hardness Duro A, pts. | 80 | 80 | 80 | 78 |
| Specific Gravity | 1.323 | 1.326 | 1.324 | 1.324 |
| UNTREATED NYLON | | | | |
| Average Adhesion Force, lbf/in width | 8.43 | 7.97 | 9.63 | 10.13 |
| std.dev | 1.31 | 1.60 | 1.23 | 1.19 |

TABLE XI-continued

ISOCYANATE TREATED NYLON

| | | | | |
|---|---|---|---|---|
| Average Adhesion Force, lbf/in width | 24.84 | 27.90 | 30.24 | 34.93 |
| std.dev | 1.51 | 4.56 | 4.54 | 3.95 |
| | Rubber Failure → | | | |

UNTREATED ARAMID

| | | | | |
|---|---|---|---|---|
| Average Adhesion Force, lbf/in width | 5.54 | 4.09 | 6.44 | 4.80 |
| std.dev | 0.57 | 1.12 | 0.76 | 0.46 |

ISOCYANATE TREATED ARAMID

| | | | | |
|---|---|---|---|---|
| Average Adhesion Force, lbf/in width | 5.50 | 8.20 | 9.78 | 9.32 |
| std.dev | 0.31 | 1.03 | 2.27 | 0.88 |

UNTREATED POLYESTER

| | | | | |
|---|---|---|---|---|
| Average Adhesion Force, lbf/in width | 8.90 | 9.72 | 17.77 | 17.39 |
| std.dev | 1.33 | 0.33 | 4.59 | 6.49 |

Method of Measuring Cord Adhesion

Esters were evaluated to determine their effect on adhesion of cords to rubbers when combined with an adhesive resin. The following method is for determining the relative strip-peel adhesion of reinforcing fibers, including natural and manmade filaments and spun yarns, to various rubber compounds and elastomers. This method is conventionally used with industrial weight fibers of 500 denier or greater. Typically, the most common elastomers and compounds employed are natural rubber, styrene butadiene rubber, copolymers of olefins with non-conjugated dienes (EPDM), polychloroprene rubber (CR), acrylonitrile butadiene elastomer (NBR), chlorosuphonated polyethylene elastomer (CSM), polyisoprene rubber, isobutylene-isoprene copolymeric rubber, chlorinated isobutylene-isoprene copolymeric rubber, brominated isobutylene-isoprene copolymeric rubber, polyvinylchloride, urethane, and blends thereof, but this technique can be modified to determine fiber adhesion to a wide variety of materials.

The adhesion testing described herein was performed in accordance with ASTM D 4393–85 "Strap Peel Adhesion of Reinforcing Cords or Fabrics to Rubber Compounds."

Typically, 1"×5" strips of fiber/rubber composite materials were prepared for testing. Fibers were positioned onto a tape backing using a rotatable cylinder. The tape backing was applied to a milled elastomer or rubber compound under high temperature and pressure in a hydraulic press (i.e., at curing, extruding, or other conditions) to form a cord- or fabric-reinforced composite material. The composite was then cut into strips for adhesion measurements (e.g., through separation load values, appearance, etc.).

Procedure

An ASTM 429 mold was placed in a compression press (capable of achieving temperatures between 250° F. and about 400° F., and a pressure of about 125 tons) and the temperature was set within ±2° F. of the vulcanization temperature (cure temperature) for the specific rubber compound used. The press was maintained within the specified temperature range for about 30 minutes.

Three strips of 3" wide masking tape (a suitable masking tape is #515 Masking Tape, Anchor Continental, Inc. Columbia, S.C.), with adhesive side out, were wrapped around the rotatable cylinder. The three strips were overlapped to achieve a tape backing having a total width of about 7". Six 1" wide fiber samples were wrapped onto the tape backing. The same or different yarn samples can be wound onto each tape backing. Each fiber or cord sample should be wound, however, such that there is no overlapping of fibers and no space between adjacent fibers. Typically, three strips of each fiber sample were prepared and tested.

The fibers were secured with 1" wide masking tape, and the strips were marked A, B, C, D, E, and F. The six wound samples were removed from the cylinder by cutting across the cylinder.

A 5"×7" piece of unvulcanized compounded rubber to be tested, which has been milled to a specified thickness (0.250±0.20 inches), was cut. The mold surface which will be in contact with the fiber assembly was cleaned with n-heptane.

The preheated mold was removed from the press. The fiber samples were placed at the bottom mold plate with the masking tape backing face down, and the fibers facing up. A 1"×7" strip of aluminum foil was placed on the back edge of the fiber samples so that the fibers are perpendicular to the aluminum foil and about one inch of their length covers the aluminum foil strip. Each strip has a specified position in the press. The cleaned 5"×7" unvulcanized rubber slab was then on top on the fiber assembly. The preheated top mold plate was placed on top of the samples to form a sandwich of mold top plate, rubber compound, aluminum foil, yarn samples, tape and bottom plate. This sandwich is then placed in the preheated compression press and a pressure of about 125 tons is applied. The pressure and temperature are maintained for the specified time (cure time).

The mold assembly was removed from the press at the end of the cure time. It is important not to disturb the fiber composite while separating the pad from the mold plates. Typically, the pad was placed in cold water to expedite the cooling process. The pad was cooled to ambient temperature prior to marking the pad for identification.

The adhesion pad should sit for an extended period ("conditioning period"), e.g., overnight, prior to cutting into the 1"×5" strips for adhesion testing. As much of the aluminum foil strip as possible was removed to give a starting separation between the fiber sample and the rubber compound. The foil can be left in place if too difficult to remove. After conditioning, each 5"×7" rubber section was cut into six 1"×5" strips such that only one fiber to be tested is contained in each strip.

Each 1"×5" adhesion composite strip was tested on the Instron 4201 tensile/compression machine (Instron Corporation, Canton, Mass.) according to method 08 of the Instron Series IX Materials Testing™ Software.

TABLE XII

| Material | Chemical Description | Supplier |
|---|---|---|
| SMR-L | Natural rubber | Alcan |
| Kadox 930 | Zinc Oxide | The C. P. Hall Company |
| Stearic Acid R.G. | Stearic Acid, rubber grade | The C. P. Hall Company |
| N-330 | Carbon Black | JM Huber or Degussa |
| Spider Sulfur | Elemental Sulfur | The C. P. Hall Company |
| Santocure TBSI | N-tert-butyl-di(2-benzothiazolesulfen)imide | Harwick Standard |
| RX-13577 | Tridecyl tallate | The C. P. Hall Company |
| RX-13804 | Di(2-ethylhexyl)dimerate | The C. P. Hall Company |
| RX-13824 | Ditridecyl Dimerate | The C. P. Hall Company |
| Plasthall DOS | Dioctyl sebacate | The C. P. Hall Company |
| Paraplex A-8000 | Polyester Adipate | The C. P. Hall Company |
| Staflex DBM | Dibutyl maleate | The C. P. Hall Company |
| DiCup 40 KE | Dicumyl Peroxide on Burgess Clay | Hercules |
| RX-13845 | 36% RX-13804, 36% Cyrez ® D-148M, 28% Hydrated Amorphous Silica | The C. P. Hall Company |
| Cyrez ® Resin D-148M | Melamine Resin Powder Concentrate | Cytec |
| N-326 | Carbon Black | JM Huber |
| Cobalt Naphthenate | Metal Carboxylate adhesion promoter | Sheperd |
| Santoflex 13 | N-Isopropyl-N'-phenyl-p-phenylenediamine | Harwick |
| PVI | N-(cyclohexylthio) phthalimide | Flexsys |
| Pennacolite Resin | Formaldehyde Resin | Indspec |
| Vulkacit DZ | Benzothiazl-2-dicyclohexyl-sulfenamide | Bayer |
| Resimene | Hexamethoxymelamine | Solutia |
| Nordel IP3720 | Hydrocarbon Rubber | DuPont |
| N762 | Carbon Black | JM Huber |
| Ricon 150 | Liquid Polybutadiene | Ricon |
| TMTD | Tetramethyl thiuram disulfide | R. T. Vanderbilt |
| Rotax | 2-mercaptobenzothiazole | R. T. Vanderbilt |
| SR 350 | Acrylic Ester | Sartomer |
| UBS020602 | Di(2-ethylhexyl) dimerate, hydrogenated | The C. P. Hall Company |
| Cyrez ® Resin CRA-133M | Melamine Resin Powder concentrate | Cytec |
| Cyrez ® Resin CRA-148M | Melamine Resin Powder concentrate | Cytec |
| Royalene 501 | Ethylene-propylene ethylidene norbomene rubber 57/43 EP Ratio | Uniroyal |
| Royalene 502 | ENB third monomer 62/38 EP ratio | Uniroyal |
| N-550 | Carbon Black | Engineering Carbon |
| RX-13782 | Capric Tallate | The C. P. Hall Company |
| RX-13805 | Di(2-ethylhexyl) dimerate | The C. P. Hall Company |
| RX-13806 | Didecyl dimerate | The C. P. Hall Company |
| RX-13853 | Di-hexyldecyl tallate | The C. P. Hall Company |
| UBS 020602 | Di (2-ethylhexyl) dimerate (Pripol 1006) | The C. P. Hall Company |
| UBS 120601 | polyester dimerate | The C. P. Hall Company |
| UBS 121201 | polyester dimerate | The C. P. Hall Company |
| Sunpar 2280 | Paraffinic Oil | Sun Oil |
| Premix MBT | 2-mercaptobenzothiazole | The C. P. Hall Company |
| Premix TMTD | Tetramethyl thiuram disulfide | The C. P. Hall Company |
| Premix DPTT | Dipentamethylene thiurum (tetra)sulfide | The C. P. Hall Company |
| Premix TDEC | Tellurium diethyldithiocarbamate | The C. P. Hall Company |
| UBS051602 | Dioleyl dimerate | The C. P. Hall Company |
| UBS060302 | Ditridecyl dimerate | The C. P. Hall Company |
| BM050702 | Pentaerythritol tetratallate | The C. P. Hall Company |
| Royalene IM7200 | blend of ethylene-propylene-ethylidene norbomene rubber with polyethylene dust 76/24 EP Ratio | Uniroyal |
| RX-13822 | Tridecyl dimerate | The C. P. Hall Company |
| RX-13823 | Polyester dimerate | The C. P. Hall Company |
| Trigonox 145-45B-pd | 2,5-dimethyl-2,5-di-(tert-butylperoxy)hexyne-3, 45% supported on calcium carbonate | Akzo Nobel |
| Tyrin CPE CM 0730 | chlorinated polyethylene 30% chlorine | Dupont Dow |
| N-774 | carbon black | Degussa Engineered Carbons |
| N-650 | carbon black | Degussa Engineered Carbons |
| Albacar 5970 | calcium carbonate | The C. P. Hall Company |

TABLE XII-continued

| Material | Chemical Description | Supplier |
|---|---|---|
| Paraplex G-62 | epoxidized soybean oil | The C. P. Hall Company |
| RX-13845 | Micro Cel E 28 wt. %, RX-13804 36 wt. %, Cyrez ® CRA-138M 36 wt. % | The C. P. Hall Company |
| Micro Cel E | Calcium Silicate | The C. P. Hall Company |
| Cyrez ® CRA-138M | Melamine Formaldehyde resin | Cytec |
| Cyrez ® CRA-148M | Melamine Formaldehyde resin | Cytec |
| VulCup 40KE | 2,2'-bis(tert-butylperoxy diisopropylbenzene | Harwick Standard |
| Triganox 17/40 | 4,4-bis(tert-butyl peroxy)-3,3,5-trimethylcyclohexane | Akzo Nobel |
| PLB 5405 (75%) | Trimethylolpropane trimethyl acrylate | Flow Polymer Incorporated |
| SMR CV 60 | Natural Rubber | |
| Process Oil C-255E | Parraffinic Oil | The C. P. Hall Company |
| RX-13896 | Di(2-ethylhexyl) dimerate (Unidyme 22) | The C. P. Hall Company |
| Sulfur | Sulfur | The C. P. Hall Company |
| Santocure TBBS | N-t-butyl-2-benzothiazolesulfenamide | Harwick Standard |
| Hallco TE-577 | Tridecyl Tallate | The C. P. Hall Company |
| RX-13653 | pentaerythritol tetratallate | The C. P. Hall Company |
| RX-13892 | Diolelyl dimerate | The C. P. Hall Company |
| Calcium Oxide | Calcium Oxide | The C. P. Hall Company |
| Plasthall TOTM | 72 wt. % Trioctyl Trimellitate, 28 wt. % Hydrated Amorphous Silica | The C. P. Hall Company |
| Flectol TMQ | 2,2,4-Trimethyl-1,2-dihydroquinoline, polymerized | Flexsys |
| | Untreated nylon fiber | Beaver Manufacturing Co. |
| Powerloc | Isocyanate treated nylon fiber | Beaver Manufacturing Co. |
| | Untreated aramid fiber | Beaver Manufacturing Co. |
| Beaverloc | Isocyanate treated aramid fiber | Beaver Manufacturing Co. |
| | Untreated polyester fiber | Beaver Manufacturing Co. |

In accordance with an important feature of the compositions, methods and articles described herein, the combination of one or more of the long chain esters described herein and combined with the melamine- or phenol-containing adhesive resin (the combination being referred to herein as the "adhesion promoter" or "adhesion promoter system") can be used in liquid form by providing the ester/resin adhesion promoter in solution (1) by solubilizing both components with one or more suitable organic solvents or (2) by emulsifying the ester and resin components in water with one or more suitable emulsifying agents. The water-based emulsion should have an HLB value of about 4 to about 5 for best ester dispersion in the emulsion. In liquid form, the adhesion promoter has a number of advantages, particularly the ability to coat a substrate, such as a metal or polymeric substrate, with the liquid ester/resin adhesion promoter for adherence of an elastomer to the substrate, without changing the composition of the elastomer. Other advantages include (1) the ability to prepare a concentrated, master batch of the adhesion promoter having a relatively high concentration, e.g., 50–90% by weight of the adhesion promoter that can be diluted upon addition to an elastomeric composition or upon substrate coating; (2) the ability to include excess alcohol, e.g., 2-ethylhexanol, during the synthesis of the long chain ester portion of the liquid adhesion promoter, for use as a solvent for solubilizing the resin portion of the liquid adhesion promoter. The use of excess alcohol during the synthesis of the esters is particularly advantageous for ester synthesis since the esterification reaction proceeds faster with excess alcohol. Since the excess alcohol is useful in solubilizing the resin, the excess alcohol can remain with the synthesized ester without removing much, or any, of the excess alcohol in an ester concentration or purification step.

The liquid adhesion promoter, whether solubilized in an organic liquid or emulsified in a water-based emulsion, can be added to the elastomeric composition for adhesion to a substrate, e.g., a metal, polymeric layer, film, or fibrous, e.g., fabric, substrate, or can be used to pre-treat, e.g., coat, the substrate, e.g., a metal or a polymeric layer, film, fibrous or fabric substrate for adhesion of the elastomer thereto. In another embodiment, the substrate, for example, polymeric sheets, films, fibers, yarns and/or fabrics, e.g., nylon, glass, ARAMID, or polyester, can be pretreated with the resin component of the adhesion promoter system (known in the art as an "isocyanate pretreatment") for adhesion of the substrate to an elastomer. The resin-treated substrate then can be treated with the ester component of the adhesion promoter system for improved adherence of the elastomer to the substrate. The resin-treated substrate can be ester treated in any manner, preferably by dipping or coating the resin-treated substrate with an organic solution of the ester or a water-based emulsion containing the ester. Alternatively, the ester can be added to the elastomer for contact with and adherence to the resin-treated substrate, or the ester and resin combination (adhesion promoter system) can be applied to the substrate as a coating, which preferably is dried prior to contact with the elastomer. As previously disclosed, the adhesion promoter system can be added directly to the elastomer composition.

The organic solution (RX-13928, hereinafter "Solution") and water-based emulsion (RX-13937 hereinafter "Emulsion") versions of the liquid adhesion promoters described herein were tested for adherence to various elastomers. The organic solution version of the adhesion promoter was tested (1) by adding the organic solution directly to the elastomer compositions, and (2) by pre-treating the substrate with the combined ester/resin adhesion promoter composition. The water-based emulsion was tested only by pre-treating the substrate prior to elastomer adherence. The data are shown in the following Tables XIII to XV. In the following Tables XIII to XV, substrates pre-treated with the liquid adhesion promoter compositions (whether organic solution or water-based emulsion) were oven dried for 30 hours at 65° C. prior to applying the elastomer.

TABLE XIII

Solvent Based Liquid Adhesion Promoter For Brass

| Recipe | Control 1 | Solution 2 | Solution 3 | RX-13804 4 | RX-13892 5 |
|---|---|---|---|---|---|
| Elastomer Composition (Parts by wt.) | | | | | |
| Nordel IP 3720 (EPDM) | 100.00 | | | | |
| N 762 | 56.00 | | | | |
| Kadox 930 | 5.00 | | | | |
| Ricon 150 | 5.00 | | | | |
| SR 350 | 4.00 | | | | |
| Solution | — | 8.00 | 10.00 | — | — |
| RX-13804 | — | — | — | 4.00 | — |
| RX-13892 | — | — | — | — | 4.00 |
| Subtotal | 170.00 | 178.00 | 180.00 | 174.00 | 174.00 |
| Mill Addition (Parts by wt.) | | | | | |
| VULCUP 40KE | 7.00 | | | | |
| Total | 177.00 | 185.00 | 187.00 | 181.00 | 181.00 |
| Major Variable | | | | | |
| Processing Properties | | | | | |
| Mooney Viscosity at 120° C. (250° F.) | | | | | |
| Minimum Viscosity | 28.4 | 22.8 | 21.1 | 25.0 | 24.6 |
| t5, minutes | 8.9 | 8.9 | 9.3 | 9.4 | 9.9 |
| t10, minutes | 9.4 | 9.5 | 10.0 | 10.0 | 10.6 |
| t35, minutes | 11.0 | >60 | >60 | 12.3 | >60 |
| Oscillating Disc Rheometer at 177° C. (350° F.) | | | | | |
| $M_L$ | 8.0 | 6.4 | 6.5 | 7.8 | 7.9 |
| $M_H$ | 110.5 | 86.0 | 82.1 | 99.9 | 105.4 |
| $t_s2$, minutes | 0.9 | 1.0 | 1.0 | 1.0 | 1.0 |
| t'c(90), minutes | 6.4 | 6.8 | 7.2 | 7.3 | 8.4 |
| 1.25 * t'c(90), minutes | 8.0 | 8.5 | 9.0 | 9.2 | 10.5 |
| Cure Rate Index | 18.2 | 17.2 | 16.2 | 15.8 | 13.5 |
| | Recipe JEKS1-170 | | | | |
| Major Variable | | | | | |
| Original Physical Properties | | | | | |
| Stress @ 100% Elongation, MPa | 11.2 | 6.2 | 5.8 | 8.0 | 8.3 |
| psi | 1625 | 905 | 840 | 1155 | 1205 |
| Tensile Ultimate, MPa | 16.7 | 14.2 | 12.2 | 15.7 | 15.2 |
| psi | 2415 | 2060 | 1770 | 2280 | 2205 |
| Elongation @ Break, % | 135 | 195 | 195 | 170 | 165 |
| Hardness Duro A, pts. | 85 | 82 | 82 | 83 | 84 |
| Specific Gravity | 1.1058 | 1.104 | 1.103 | 1.104 | 1.101 |
| Metal Adhesion-ASTM D429 | | | | | |
| Solution Treated Brass (painted brass-like primer) | | | | | |
| Adhesion Force, lbf/in. width | 60.03 | 74.12 | 16.23 | 77.4 | 71.43 |
| Failure Type | R | R | RM | R | R |
| % Failure | 100 | 55 | 100 | 100 | 100 |
| Emulsion Treated Brass | | | | | |
| Adhesion Force, lbf/in. width | Fail | Fail | 20.64 | 39.02 | 54.94 |
| Failure Type | RM | RM | RM | RM | R |
| % Failure | 100 | 100 | 100 | 100 | 100 |

Note:
Slight exudation on surface of 6 × 6 sheets in an unstressed state.
R = rubber failure,
RC = rubber-dement failure,
CP = cement-primer failure,

TABLE XIII-continued

Solvent Based Liquid Adhesion Promoter For Brass

| Recipe | Control 1 | Solution 2 | Solution 3 | RX-13804 4 | RX-13892 5 |
|---|---|---|---|---|---|

M = primer-metal failure,
RM = rubber metal failure

TABLE XIV

Water-Based Emulsion Liquid Adhesion Promoter For Brass

| Recipe JEKS1-150 | Control 1 | Emulsion 2 | Emulsion 3 |
|---|---|---|---|
| Nordel IP 3720 | 100.00 | 100.00 | 100.00 |
| N 762 | 56.00 | 56.00 | 56.00 |
| Kadox 930 | 5.00 | 5.00 | 5.00 |
| Ricon 150 | 5.00 | 5.00 | 5.00 |
| SR 350 | 4.00 | 4.00 | 4.00 |
| Emulsion | | 8.00 | 10.00 |
| Subtotal | 170.00 | 178.00 | 180.00 |
| Mill Addition | | | |
| VULCUP 40KE | 7.00 | 7.00 | 7.00 |
| TOTAL | 177.00 | 185.00 | 187.00 |
| Major Variable | Control | Emulsion 8.00 | Emulsion 10.00 |
| Viscosity and Curing Properties | | | |
| Mooney Viscosity at 121° C. (250° F.) | | | |
| Minimum Viscosity | 28.00 | 26.4 | 26.4 |
| t5, minutes | 10.5 | 13.4 | 9.8 |
| t10, minutes | 11.0 | 14.5 | 10.3 |
| t35, minutes | 12.7 | 18.9 | >60.0 |
| Oscillating Disc Rheometer at 177° C. (350° F.) | | | |
| $M_L$ | 12.3 | 11.5 | 11.6 |
| $M_H$ | 120.5 | 86.3 | 73.7 |
| $t_s2$, minutes | 0.9 | 0.9 | 1.0 |
| t'c(90), minutes | 7.0 | 8.5 | 7.5 |
| 1.25 * t'c(90), minutes | 8.8 | 10.6 | 9.4 |
| Cure Rate Index | 16.5 | 13.2 | 15.4 |
| Original Physical Properties | | | |
| Stress @ 100% Elongation, MPa | 10.9 | 6.5 | 5.6 |
| psi | 1575 | 945 | 810 |
| Stress @ 200% Elongation, MPa | — | 13.3 | 10.4 |
| Stress @ 300% Elongation, MPa | — | — | — |
| Tensile Ultimate, MPa | 16.8 | 13.3 | 10.9 |
| psi | 2440 | 1935 | 1585 |
| Elongation @ Break, % | 135 | 200 | 210 |
| Hardness Duro A, pts. | 84 | 84 | 84 |
| Specific Gravity | 1.113 | 1.110 | 1.111 |
| Metal Adhesion-ASTM D429 | | | |
| Adhesion Force, lbf/in. width | Fail | 22.8 | 23.3 |
| Failure Type | RM | RM | RM |
| % Failure | 100 | 100 | 100 |

R = rubber failure,
RC = Rubber-cement failure,
CP = cement-primer failure,
M = primer-metal failure,
RM = rubber metal failure
— Date Completed: Jan. 30, 2003

TABLE XV

Liquid Adhesion Promoter System For ARAMID Fiber

| Recipe JEKS1-100 | 1 |
|---|---|
| Elastomer Composition (chlorinated polyethylene) | |
| Tyrin CP 0730 | 100.00 |
| N 774 Carbon Black | 55.00 |
| N 650 Carbon Black | 30.00 |
| Albacar 5970(CaCO$_3$) | 10.00 |
| PARAPLEX G-62 | 15.00 |
| PLASTHALL TOTM | 30.00 |
| Calcium Oxide | 4.40 |
| Flectol TMQ | 0.20 |
| Subtotal | 244.60 |
| Mill addition | |
| Vulcup 40KE | 9.50 |
| Triganox 17/40 | 3.50 |
| PLB 5405(75%) | 6.70 |
| TOTAL | 264.30 |
| Major Variable | Control |
| Viscosity and Curing Properties | |
| Mooney Viscosity at 132° C.(270° F.) | |
| Minimum Viscosity | 40.2 |
| t5, minutes | 2.5 |
| t10, minutes | 3.0 |
| t35, minutes | 4.8 |
| Oscillating Disc Rheometer at 160° C.(320° F.) | |
| $M_L$ | 9.7 |
| $M_H$ | 40.6 |
| $t_s2$, minutes (Continued) | 1.3 |
| t'c(90), minutes | 15.8 |
| 1.25 * t'c(90), minutes | 19.8 |
| Cure Rate Index | 6.9 |
| Original Physical Properties | |
| Stress @ 100% Elongation, MPa | 5.2 |
| psi | 760 |
| Stress @ 200% Elongation, MPa | 9.5 |
| Stress @ 300% Elongation, MPa | — |
| Tensile Ultimate, MPa | 11.5 |
| psi | 1665 |
| Elongation @ Break, % | 260 |
| Hardness Duro A, pts. | 78 |
| Specific Gravity | 1.329 |
| Yarn Adhesion-CPH Method | |
| EMULSION TREATED ARAMID 1008 | |
| Average Adhesion Force, lbf/in. width | 7.67 |
| std. dev | 1.16 |
| SOLUTION TREATED ARAMID 1008 | |
| Average Adhesion Force, lbf/in. width | 8.34 |
| std. dev | 1.51 |
| UNTREATED TWARON ARAMID 1008 | |
| Average Adhesion Force, lbf/in. width | 5.23 |
| std. dev | 0.83 |

TABLE XV-continued

Liquid Adhesion Promoter System For ARAMID Fiber

| Recipe JEKS1-100 | 1 |
|---|---|
| BEAVERLOC 102 TWARON ARAMID | |
| Average Adhesion Force, lbf/in. width | 10.64 |
| std. dev | 0.75 |
| Weight Retention After 30 hrs. @ 65° C. SOLUTION | |
| Weight Retention, grams | 1.45 |
| Weight Retention, % | 48.70 |
| EMULSION | |
| Weight Retention, grams | 1.48 |
| Weight Retention, % | 49.70 |

NOTE:
Treated yarns (Solution & Emulsion) oven dried for 30 hrs @ 65 C.

The following Table XVI is a summary of the solvent solubilities of the melamine (Resimene 3520) and RX-13804 (di-2-ethylhexyl dimerate) for use in selecting solvents capable of solubilizing both the ester and the resin in making a liquid solution of the adhesion promoter. The solubilities were only determined at 1:1 mixtures of solvent to dimerate/melamine. If both the samples were soluble in the solvent, the solutions were again mixed at a 1:1 ratio of dimerate+solvent to Melamine+solvent. The samples provide complete solubility of both dimerate ester and Melamine resin so long at the composition is at a 13% by weight or greater percent solvent level.

TABLE XVI

Melamine/Dimerate Solubilities
Spot Checks

| Solvent | RX13804 | Melamine | RX13804 + Melamine |
|---|---|---|---|
| Xylene | S | S | S |
| 1,4-Dioxane | S | S | S |
| Toluene | S | S | S |
| Acetonitrile | I | S | I |
| Ethanol | I | S | I |
| n-Hexanol | S | S | S |
| Ethyl Acetate | S | S | S |
| N,N-Dimethylformamide | I | S | I |
| n-Butanol | S | S | S |
| 2-EH (2-ethylhexanol) | S | S | S |
| Methyl Ethyl Ketone | S | S | S |
| Methyl Isobutyl Ketone | S | S | S |
| Butyl Acetate | S | S | S |
| Chloroform | S | S | S |
| Carbon Tetrachloride | S | S | S |
| Hexane | S | I | I |
| Heptane | S | I | I |
| Isopropanol | S | S | S |
| Isodecyl alcohol | S | S | S |
| Isotridecyl alcohol | S | S | S |
| Ethylene glycol monobutyl ether | S | S | S |
| Dipropylene glycol monobutyl ether | S | S | S |

Melamine/Dimerate Solubilities with 2-EH
Quantitative

| Sample | % RX13804 | % Melamine | % 2-EH | Appearance |
|---|---|---|---|---|
| 1 | 42.5 | 42.5 | 15.0 | Clear |
| 2 | 43.0 | 43.0 | 14.0 | Clear |
| 3 | 43.2 | 43.2 | 13.6 | Clear |
| 4 | 43.3 | 43.3 | 13.4 | Clear |
| 5 | 43.5 | 43.5 | 13.0 | Hazy (Insoluble) SJS |

S = Soluble;
I = Insoluble

In order to homogeneously emulsify the ester and/or the resin components of the adhesion promoter in a water-based carrier, any suitable emulsifying/dispersing agents can be used that are capable of forming a stable emulsion. Since the esters have a very low polarity and the resins have a very high polarity, if both the ester and resin are emulsified in a water-based carrier, generally a combination of emulsifying agents is needed to provide a homogeneous, stable emulsion in water. It has been found that the water-based emulsions should have a hydrophile/lipophile balance (HLB) in the range of about 4 to about 5 for best emulsification. Particular combinations of emulsifying agents found to be especially effective in providing a homogeneous, stable water-based emulsion of the dimerate esters and adhesive resin include a combination of an anionic metal stearate, e.g., potassium stearate for the ester, and a non-ionic sorbitan oleate for the adhesive resin, as shown in the following emulsion preparation guide:

| RX-13804 | 49 | |
|---|---|---|
| Stearic acid | 0.2 | ⎫ |
| KOH (45%) | 0.1 | ⎬ K Stearate ⎭ |
| Cyrez CRA-138M | 48.7 | |
| Span80 (sorbitan oleate) | (2 to 6%) based on the weight of dimerate ester (RX-13804) | |

After adding Stearic acid, heat up to 90° C.; add KOH slowly while mixing, mix for 5 minutes, then cool the mixture down to around 50° C. Then add Cyrez, then Span80.

Water-Based Emulsion Adhesion Promoter
RX-13937

| Composition Component | % by wt. | Chemical | Supplier |
|---|---|---|---|
| RX-13804 | 49.0 | Di-2-ethylhexyl dimerate | CP Hall |
| Stearic acid | 0.2 | tripled pressed Stearic acid | Witco |
| KOH (45%) | 0.1 | Potassium hydroxide 45% | Ashta |
| Cyrez CRA-138M | 48.7 | methylated melamine, formaldehyde polymer | Cytec |
| Span80 | 2.0 | sorbitan monooleate | Uniqema |

| Solution-Based Adhesion Promoter RX-13928 | | | |
|---|---|---|---|
| Composition Component | % by wt. | Chemical | Supplier |
| ester | 42.5 | Di-2-ethylhexyl dimerate | CP Hall |
| resin | 42.5 | methylated melamine formaldehyde resin | UCB |
| solvent | 15.0 | 2-ethylhexanol | Sunoco |

What is claimed is:

1. A rubber composition comprising rubber selected from the group consisting of natural rubber, synthetic rubber, and a combination thereof; and a liquid adhesion promoter selected from the group consisting of a solution and a water-based emulsion containing (1) an adhesive resin in an amount of about 0.1% to about 15% by weight, based on the weight of rubber in the composition; and (2) an ester having formula I, II, III, IV or a combination of any two or more of said esters in an amount of about 0.1% to about 15% by weight, based on the weight of rubber in the composition:

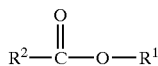

(I)

wherein $R^1$ is a $C_3$–$C_{24}$ alkyl radical, straight chain or branched, saturated, or unsaturated containing 1 to 3 carbon-to-carbon double bonds; $R^2$ is a $C_3$–$C_{24}$ saturated fatty acid residue, or an unsaturated fatty acid residue having 1 to 6 carbon-to-carbon double bonds;

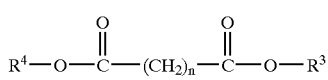

(II)

wherein n=3–24, and $R^3$ and $R^4$, same or different, are a $C_3$–$C_{24}$ alkyl radical, straight chain or branched, saturated, or unsaturated containing 1 to 3 carbon-to-carbon double bonds;

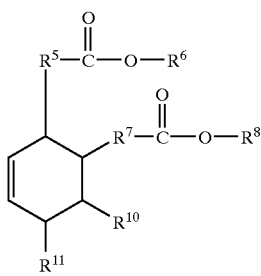

(III)

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are $C_3$–$C_{24}$ alkyl radical, straight chain or branched, saturated, or unsaturated containing 1 to 3 carbon-to-carbon double bonds; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6, carbon-to-carbon double bonds;

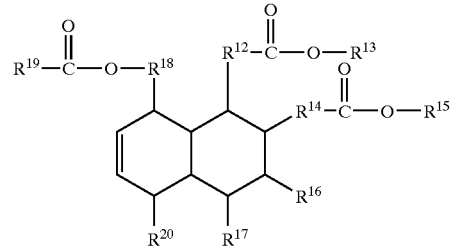

(IV)

wherein $R^{12}$, $R^{14}$ and $R^{18}$, same or different, are a $C_3$–$C_{24}$, hydrocarbon chain, straight chain or branched, either saturated or having 1 to 6 carbon-to-carbon double bonds;

$R^{13}$, $R^{15}$ and $R^{19}$, same or different, are a $C_3$–$C_{24}$ alkyl radical, straight chain or branched, saturated, or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

2. A rubber composition in accordance with claim 1, wherein the ester is selected from the group consisting of formula I, II, III, IV, and a combination of any two or more of said esters:

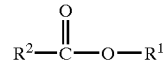

(I)

wherein $R^1$ is a $C_3$–$C_{18}$ alkyl radical, straight chain or branched, saturated, or unsaturated containing 1 to 3 carbon-to-carbon double bonds; and $R^2$ is a $C_8$–$C_{18}$ saturated fatty acid residue, or an unsaturated fatty acid residue having 1 to 3 carbon-to-carbon double bonds;

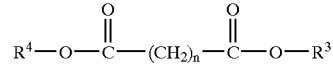

(II)

wherein n=6–18, and $R^3$ and $R^4$, same or different, are a $C_3$–$C_{18}$ alkyl radical, straight chain or branched, saturated, or unsaturated containing 1 to 3 carbon-to-carbon double bonds;

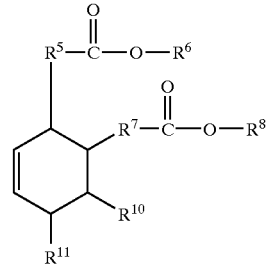

(III)

wherein $R^5$ and $R^7$, are a $C_6$–$C_{24}$ hydrocarbon chain, straight chain or branched; either saturated or having 1 to 3 carbon-to-carbon double bonds;

$R^6$ and $R^8$, same or different, are a $C_3$–$C_{18}$ alkyl radical, straight chain or branched, saturated, or unsaturated containing 1 to 3 carbon-to-carbon double bonds; and $R^{10}$ and $R^{11}$, same or different, are a $C_3$–$C_{18}$, saturated hydrocarbon chain, straight chain or branched; or an unsaturated hydrocarbon chain, straight chain or branched, containing 1 to 3 carbon-to-carbon double bonds;

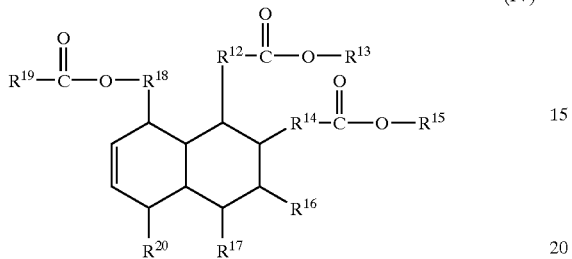

(IV)

wherein $R^{12}$, $R^{14}$ and $R^{18}$, same or different, are a $C_8$–$C_{18}$, hydrocarbon chain, straight chain or branched, either saturated or having 1 to 3 carbon-to-carbon double bonds;

$R^{13}$, $R^{15}$ and $R^{19}$, same or different, are a $C_6$–$C_{18}$ alkyl radical, straight chain or branched, saturated, or unsaturated containing 1 to 3 carbon-to-carbon double bonds; and $R^{16}$, $R^{17}$ and $R^{20}$, same or different, are a $C_6$–$C_{18}$ saturated hydrocarbon chain, straight chain or branched; or an unsaturated $C_6$–$C_{18}$ hydrocarbon-chain, straight chain or branched, containing 1 to 3 carbon-to-carbon double bonds.

3. The rubber composition of claim 1, wherein the adhesive resin is a condensation product of a methylene acceptor and a methylene donor.

4. The rubber composition in accordance with claim 3, wherein the adhesive resin is selected from the group consisting of phenol-formaldehyde, melamine-formaldehyde; naphthol-formaldehyde; polyepoxide; a reaction product of triallyl cyanurate, resorcinol, and formaldehyde; a reaction product of p-chlorophenol, resorcinol, and formaldehyde; a copolymer of styrene, butadiene, and 2-vinylpyridine; and mixtures thereof.

5. The rubber composition in accordance with claim 4, wherein the phenol-formaldehyde resin is resorcinol-formaldehyde.

6. The rubber composition in accordance with claim 1, wherein the adhesive resin is a monomer or oligomer selected from the group consisting of melamine, acetoguanamine, benzoguanamine, cyclohexylguanamine and glycoluril, which contained vinyl terminated rascals, on average, at two or more positions on the monomer or on each unit of the oligomer, the rubber composition being free of resorcinol.

7. The rubber composition in accordance with claim 6, wherein at least one of the adhesive resins has been further substituted on average at one or more positions with a radical which comprises carbamoylmethyl or amidomethyl.

8. A rubber composition in accordance with claim 6, wherein the adhesive resin is selected from compounds of the formula:

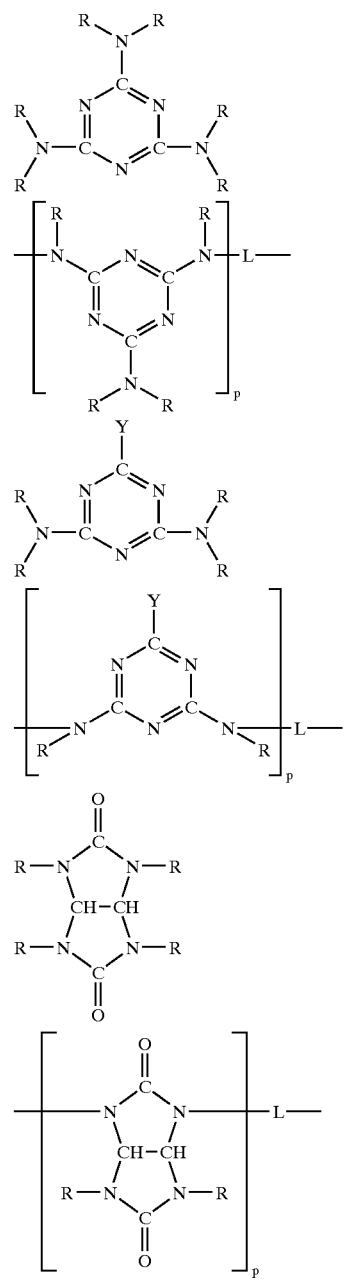

and positional isomers thereof, wherein, in each monomer and in each polymerized unit of the oligomers, Y is selected from methyl, phenyl and cyclohexyl, and, on average, at least two R are —$CH_2$—$R^1$, and any remaining R are H, and at least 2 $R^1$ are radicals selected from

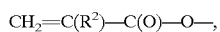

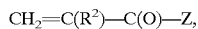

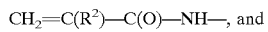

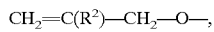

wherein $R^2$ is hydrogen or $C_1$–$C_{18}$ alkyl, and Z is a radical selected from

—O—CH$_2$—CH$_2$—O—,

—O—CH$_2$—CH(CH$_3$)—O—,

—O—CH$_2$—CH$_2$—CH$_2$O—, and

—O—CH(C$_2$H$_5$)—O—, and any remaining R$^1$ radicals are selected from

—O—R$^3$,

—NH—C(O)—OR$^4$, and

—NH—C(O)—R$^4$, and wherein R$_3$ is hydrogen or R$_4$, and R$_4$ is a C$_1$–C$_{18}$ alkyl, alicyclic, hydroxyalkyl, alkoxyalkyl or aromatic radical, and in the oligomers, P is 2 to about 10, and L is methylene or the radical

—CH$_2$—O—CH$_2$—.

9. A rubber composition in accordance with claim 8, wherein on average at least one R$^1$ in each monomer or in each oligomerized unit of the adhesive resin is:

—NH—C(O)—OR$^4$ wherein R$^4$ is as defined in claim 8.

10. A rubber composition in accordance with claim 9, wherein the adhesive resin is a compound of the formula

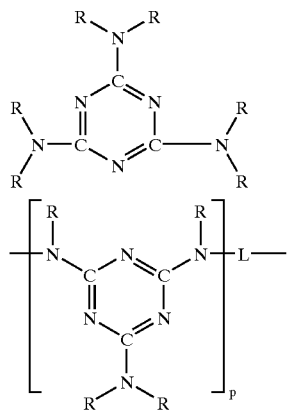

wherein P is 2 to about 10, L is methylene or the radical —CH$_2$—O—CH$_2$—, and R is as follows:
at least two R are —CH$_2$—R$^1$, and any remaining R are H, and at least 2 R$^1$ are radicals selected from

CH$_2$=C(R$^2$)—C(O)—O—,

CH$_2$=C(R$^2$)—C(O)—Z,

CH$_2$=C(R$^2$)—C(O)—NH—, and

CH$_2$=C(R$^2$)—CH$_2$—O—, wherein R$^2$ is hydrogen or C$_1$–C$_{18}$ alkyl, and Z is a radical selected from

—O—CH$_2$—CH$_2$—O—,

—O—CH$_2$—CH(CH$_3$)—O—,

—O—CH$_2$—CH$_2$—CH$_2$O—,

—O—CH(C$_2$H$_5$)—O—, and any remaining R$^1$ radicals are selected from

—O—R$^3$,

—NH—C(O)—OR$^4$, and

—NH—C(O)—OR$^4$, and wherein R$_3$ is hydrogen or R$_4$, and R$_4$ is a C$_1$–C$_{18}$ alkyl, alicyclic, hydroxyalkyl, alkoxyalkyl or aromatic radical.

11. A rubber composition in accordance with claim 10, wherein in the adhesive resin formulas, on average at least one R radical in each monomer or in each oligomerized unit is

—CH$_2$—NH—C(O)—OR$^4$ wherein R$^4$ is a C$_1$–C$_{18}$ alkyl, alicyclic, hydroxyalkyl, alkoxyalkyl or aromatic radical.

12. A rubber composition in accordance with claim 10, wherein on average at least two R radicals are selected from

CH$_2$=C(CH$_3$)—C(O)O—C$_3$H$_6$—O—CH$_2$— and

CH$_2$=CH$_2$—C(O)O—C$_2$H$_4$—O—CH$_2$— and at least one R radical is selected from

CH$_2$—NH—C(O)—O—CH$_3$ and

CH$_2$—NH—C(O)—O—C$_3$H$_7$.

13. A rubber composition in accordance with claim 8, further comprising an additional additive selected from hydroxymethylated and alkoxymethylated, alkoxy having 1–5 carbon atoms, melamine, acetoguanamine, benzoguanamine, cyclohexylguanamine and glycoluril and their oligomers.

14. The composition in accordance with claim 6, wherein the adhesive resin is melamine or an oligomer of melamine.

15. The composition in accordance with claim 6, wherein the adhesive resin is acetoguanamine or an oligomer of acetoguanamine.

16. The composition in accordance with claim 6, wherein the adhesive resin is benzoguanamine or an oligomer of benzoguanamine.

17. The composition in accordance with claim 6, wherein the adhesive resin is cyclohexylguanamine or an oligomer of cyclohexylguanamine.

18. A rubber composition in accordance with claim 1, wherein the adhesive resin is a self-condensing alkylated triazine resin selected from the group consisting of (i), (ii), and (iii):

(i) a self-condensing alkylated triazine resin having at least one of imino or methylol functionality and represented by formula (I)

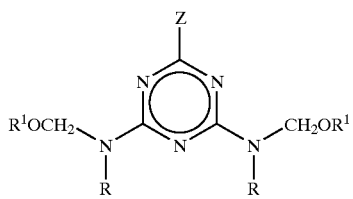 (I)

(ii) an oligomer of (i), or
(iii) a mixture of (i) and (ii), wherein
Z is —N(R)(CH$_2$OR$^1$), aryl having 6 to 10 carbon atoms, alkyl having 1 to 20 carbon atoms or an acetyl group,
each R is independently hydrogen or —CH$_2$OR$^1$, and
each R$^1$ is independently hydrogen or an alkyl group having 1 to 12 carbon atoms,
provided that at least one R is hydrogen or —CH$_2$OH and at least one R$^1$ is selected from the alkyl group; and
wherein the rubber composition is substantially free of methylene acceptor coreactants.

19. The rubber composition in accordance with claim 18, wherein at least one R group of the alkylated triazine resin is hydrogen.

20. The rubber composition in accordance with claim 19, wherein at least one R$^1$ group of the alkylated triazine resin is a lower alkyl group having 1 to 6 carbon atoms.

21. The rubber composition in accordance with claim 20, wherein the adhesive resin is melamine, benzoguanamine, cyclohexylguanamine, or acetoguanamine, or an oligomer thereof.

22. The rubber composition in accordance with claim 20, wherein Z is —N(R)(CH$_2$OR$^1$).

23. The rubber composition in accordance with claim 4, wherein the phenol-formaldehyde resin is resorcinol-formaldehyde; and the melamine-formaldehyde resin is N-(substituted oxymethyl) melamine-formaldehyde.

24. A rubber composition in accordance with claim 1, wherein the ester has the formula II and comprises a saturated diester formed by the reaction of sebacic acid and a C$_6$–C$_{24}$ alcohol, straight chain or branched, saturated, or unsaturated containing 1 to 3 carbon-to-carbon double bonds.

25. A rubber composition in accordance with claim 24, wherein the alcohol is 2-ethylhexyl alcohol, and the ester has the following formula:

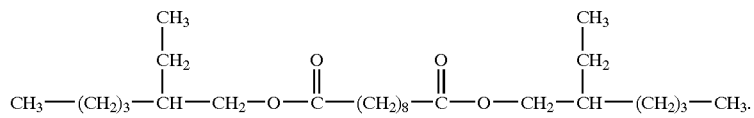

26. A rubber composition in accordance with claim 1, wherein the ester is an unsaturated diester formed by the reaction of a C$_{36}$ dimer acid and a C$_3$–C$_{18}$ alcohol, straight chain or branched, saturated, or unsaturated containing 1 to 3 carbon-to-carbon double bonds.

27. A rubber composition in accordance with claim 26, wherein the alcohol is 2-ethylhexyl alcohol.

28. A rubber composition in accordance with claim 26, wherein the alcohol is tridecyl alcohol.

29. A rubber composition in accordance with claim 26, wherein the alcohol is oleyl alcohol.

30. A rubber composition in accordance with claim 1, wherein the ester comprises the following dimer acid reacted with a C$_3$–C$_{24}$ alcohol:

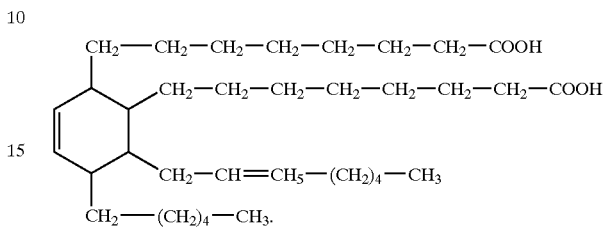

31. A rubber composition in accordance with claim 1, wherein the ester comprises the following dimer acid reacted with a C$_3$–C$_{24}$ alcohol:

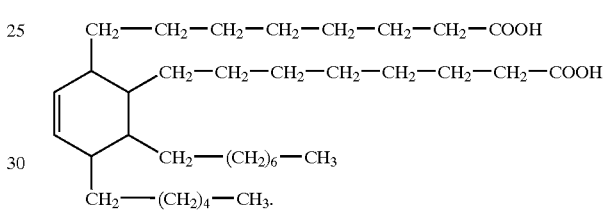

32. A rubber composition in accordance with claim 1, wherein the ester comprises the following dimer acid reacted with a C$_3$–C$_{24}$ alcohol:

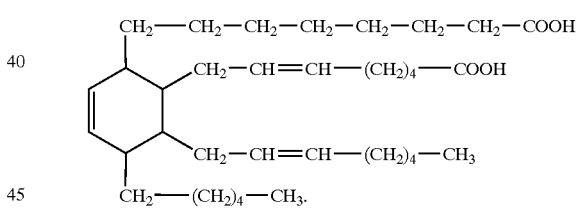

33. A rubber composition in accordance with claim 1, wherein the ester is the reaction product of a C$_3$–C$_{24}$ alcohol with a tricarboxylic acid, having the following formula:

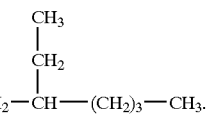

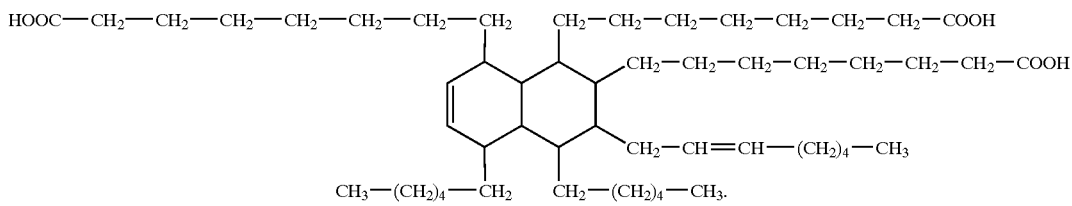

34. A rubber composition in accordance with claim 1, wherein the ester is a combination of compounds of formula I, II, III, and IV.

35. A rubber composition in accordance with claim 34, wherein the ester is a reaction product of a $C_3$–$C_{24}$ alcohol straight chain or branched, saturated, or unsaturated having 1 to 3 carbon-to-carbon double bonds, with a dimer acid.

36. A rubber composition in accordance with claim 35, wherein the alcohol is 2-ethylhexyl alcohol.

37. A rubber composition in accordance with claim 35, wherein the alcohol is a tridecyl alcohol.

38. A rubber composition in accordance with claim 35, wherein the alcohol is an oleyl alcohol.

39. The rubber composition in accordance with claim 1, wherein the $R^2$, $R^5$, $R^7$, $R^{12}$, $R^{14}$ are fatty acid residues derived from animal or vegetable fatty acids.

40. The rubber composition of claim 39, wherein the fatty acids are selected from the group consisting of butter; lard; tallow; grease; herring; menhaden; pilchard; sardine; babassu; castor; coconut; corn; cottonseed; jojoba; linseed; oiticia; olive; palm; palm kernel; peanut; rapeseed; safflower; soya; sunflower; tall; tung; and mixtures thereof.

41. The rubber composition of claim 40, wherein the fatty acid residues are selected from the group consisting of hexanoic; octanoic; decanoic; dodecanoic; 9-dodecenoic; tetradecanoic; 9-tetradecenoic; hexadecanoic; 9-hexadecenoic; octadecanoic; 9-octadecenoic; 9-octadecenoic, 12-hydroxy; 9, 12-octadecadienoic; 9, 12, 15-octadecatrienoic; 9, 11, 13-octadecatrienoic; 9, 11, 13-octadecatrienoic, 4-oxo; octadecatetrenoic; eicosanoic; 11-eicosenoic; eicosadienoic; eicosatrienoic; 5, 8, 11, 14-eicosatetraenoic; eicosapentaenoic; docosanoic; 13-docosenoic; docosatetraenoic; 4, 8, 12, 15, 19-docosapentaenoic; docosahexaenoic; tetracosenoic; and 4, 8, 12, 15, 18, 21-tetracosahexaenoic.

42. A method of increasing the adhesion of a rubber composition to a substrate, said rubber composition including a natural or synthetic rubber, and an adhesive resin, comprising adding to said rubber composition, in an amount of about 0.1% to 15% by weight, based on the weight of the rubber, a liquid ester additive of formula I, II, III, IV, or mixtures thereof:

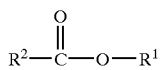

wherein $R^1$ is a $C_3$–$C_{24}$ alkyl radical, straight chain or branched, saturated, or unsaturated containing 1 to 3 carbon-to-carbon double bonds; $R^2$ is a $C_3$–$C_{24}$ saturated fatty acid residue, or an unsaturated fatty acid residue having 1 to 6 carbon-to-carbon double bonds;

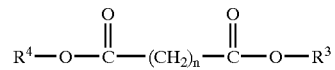

wherein n=3–24 and $R^3$ and $R^4$, same or different, are a $C_3$–$C_{24}$ alkyl radical, straight chain or branched;

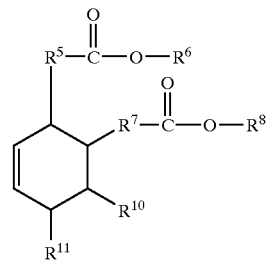

wherein $R^5$ and $R^7$, same or different, are a $C_3$–$C_{24}$ hydro carbon chain, straight chain or branched, either saturated or having 1 to 6 carbon-to-carbon double bonds;

$R^6$ and $R^7$, same or different, are a $C_3$–$C_{24}$ alkyl radical, straight chain or branched; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

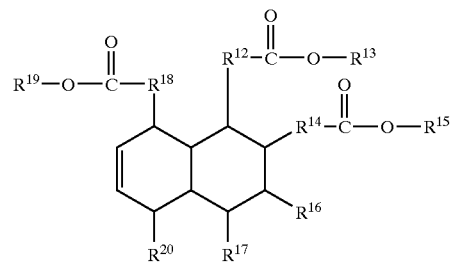

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are $C_3$–$C_{24}$ alkyl radical, straight chain or branched, saturated, or unsaturated containing 1 to 3 carbon-to-carbon double bonds; and $R^{16}$, $R^{17}$ and $R^{20}$, same or different, are $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

43. A method in accordance with claim 42, wherein the substrate is a plurality of cords.

44. A method in accordance with claim 42, wherein the substrate is a polymeric sheet or fabric.

45. A method in accordance with claim 42, wherein the substrate is flat metal stock material.

46. A method of increasing the adhesion of a rubber composition to a substrate comprising an expedient selected from the group consisting of (1) applying a liquid adhesion promoter comprising an adhesive resin component and an ester component to the substrate prior to contacting the substrate with the rubber composition; (2) contacting the substrate separately with a solvent solution or water-based emulsion containing the ester component of the liquid adhesion promoter, and contacting the substrate separately with a solvent solution or water-based emulsion containing the adhesive resin component of the liquid adhesion promoter prior to contacting the substrate with the rubber composition; (3) applying the adhesive resin component of the liquid adhesion promoter to the substrate prior to contacting the adhesive resin-applied substrate with the rubber composition containing a solvent solution or water-based emulsion containing the ester component of the liquid adhesion promoter; (4) applying the ester component of the liquid adhesion promoter to the substrate prior to contacting the ester-applied substrate with the rubber composition containing a solvent solution or water-based emulsion containing the adhesive resin component of the liquid adhesion promoter; wherein the ester component of the adhesion promoter is selected from the group consisting of formulas I, II, III, IV, and a combination of any two or more:

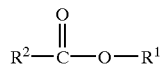

(I)

wherein $R^1$ is a $C_3$–$C_{24}$ alkyl radical, straight chain or branched, saturated, or unsaturated containing 1 to 3 carbon-to-carbon double bonds; $R^2$ is a $C_3$–$C_{24}$ saturated fatty acid residue, or an unsaturated fatty acid residue having 1 to 6 carbon-to-carbon double bonds;

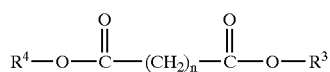

(II)

wherein n=3–24, and $R^3$ and $R^4$, same or different, are a $C_3$–$C_{24}$ alkyl radical, straight chain or branched, saturated, or unsaturated containing 1 to 3 carbon-to-carbon double bonds;

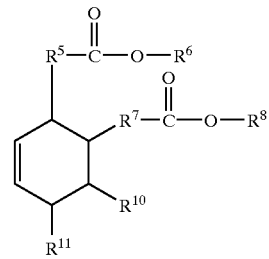

(III)

wherein $R^5$ and $R^7$, same or different, are a $C_3$–$C_{24}$ hydrocarbon chain, straight chain or branched, either saturated or having 1 to 6 carbon-to-carbon double bonds;
$R^6$ and $R^8$, same or different, are $C_3$–$C_{24}$ alkyl radical, straight chain or branched, saturated, or unsaturated containing 1 to 3 carbon-to-carbon double bonds; and
$R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6, carbon-to-carbon double bonds;

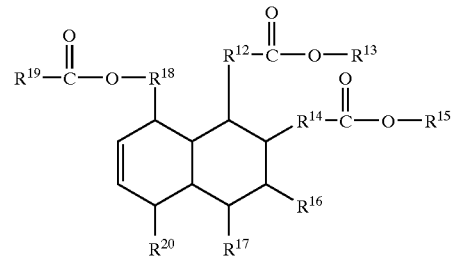

(IV)

wherein $R^{12}$, $R^{14}$ and $R^{18}$, same or different, are a $C_3$–$C_{24}$, hydrocarbon chain, straight chain or branched, either saturated or having 1 to 6 carbon-to-carbon double bonds;
$R^{13}$, $R^{15}$ and $R^{19}$, same or different, are a $C_3$–$C_{24}$ alkyl radical, straight chain or branched, saturated, or unsaturated containing 1 to 3 carbon-to-carbon double bonds; and
$R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

47. A method in accordance with claim 46, wherein the amount of the adhesive resin component contained in the rubber composition or applied to the substrate is about 0.1% to about 15% by weight, based on the weight of rubber in the composition, and the amount of ester component contained in the rubber composition or applied to the substrate is about 0.1% to about 15% by weight, based on the weight of rubber in the composition.

48. The method of claim 47, wherein the rubber composition contains a vulcanizing agent.

49. A cord-reinforced article of manufacture comprising a plurality of cords selected from polymeric cords, metal cords, glass cords, and a combination thereof, adhered to the rubber composition of claim 1.

* * * * *

UNITED STATES PATENT AND TRADEMARK OFFICE
CERTIFICATE OF CORRECTION

PATENT NO.    : 6,858,664 B2
DATED         : February 22, 2005
INVENTOR(S)   : Gary Wentworth et al.

It is certified that error appears in the above-identified patent and that said Letters Patent is hereby corrected as shown below:

<u>Title page,</u>
Item [*] Notice, insert -- This patent is subject to a terminal disclaimer --.
Item [57], ABSTRACT,
Lines 6-7, delete "tri-mesters", and insert -- tri-esters --.

<u>Column 54,</u>
Lines 5-15, delete " 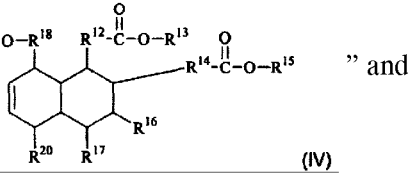 " and insert -- 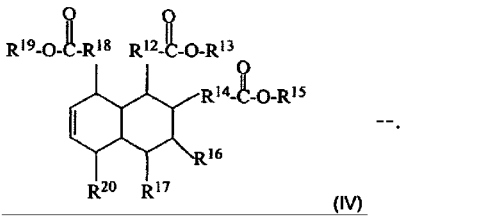 --.

Line 49, delete "$C_3$" and insert -- $C_6$ --.

<u>Column 55,</u>
Lines 10-20, delete " 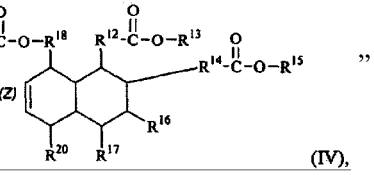 " and insert -- 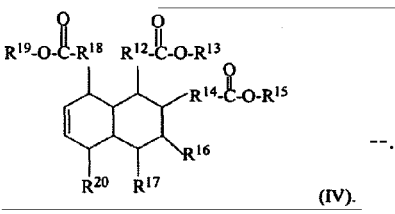 --.

Line 56, delete "rascals" and insert -- radicals --.

<u>Column 60,</u>
Lines 10-18, delete " 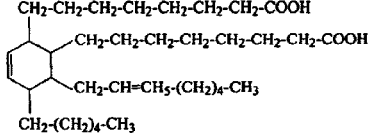 " and insert -- 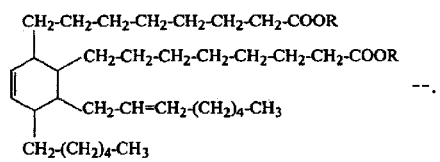 --.

UNITED STATES PATENT AND TRADEMARK OFFICE
CERTIFICATE OF CORRECTION

PATENT NO. : 6,858,664 B2
DATED : February 22, 2005
INVENTOR(S) : Gary Wentworth et al.

It is certified that error appears in the above-identified patent and that said Letters Patent is hereby corrected as shown below:

Column 61,
Line 60, insert -- (I) -- just after the chemical drawing.

Column 62,
Line 14, insert -- (II) -- just after the chemical drawing.
Line 18, delete "$C_3$" insert -- $C_6$ --.
Line 29, insert -- (III) -- just after the chemical drawing.
Line 35, delete "$R^7$" insert -- $R^8$ --.
Line 53, insert -- (IV) -- just after the chemical drawing.

Column 64,
Lines 25-35, delete " 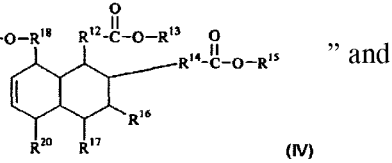 " and insert -- 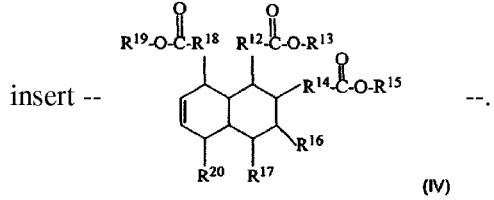 --.

Signed and Sealed this

Fourth Day of October, 2005

JON W. DUDAS
*Director of the United States Patent and Trademark Office*